United States Patent [19]

Shiraishi

[11] Patent Number: 5,111,388
[45] Date of Patent: May 5, 1992

[54] PROCESSING APPARATUS WITH FUNCTIONAL HIERARCHICAL STRUCTURE USING CORRESPONDING HIERARCHICAL MACHINE INSTRUCTION FIELDS

[75] Inventor: Hajime Shiraishi, Tokyo, Japan

[73] Assignee: Kabushiki Kaisha Toshiba, Kawasaki, Japan

[21] Appl. No.: 434,987

[22] Filed: Nov. 13, 1989

Related U.S. Application Data

[62] Division of Ser. No. 720,881, Apr. 8, 1985, Pat. No. 4,901,225.

[30] Foreign Application Priority Data

| Apr. 9, 1984 | [JP] | Japan | 59-70443 |
| Apr. 9, 1984 | [JP] | Japan | 59-70444 |
| Aug. 16, 1984 | [JP] | Japan | 59-169976 |
| Dec. 28, 1984 | [JP] | Japan | 59-276130 |

[51] Int. Cl.⁵ .................................... G06F 13/00
[52] U.S. Cl. ................... 395/800; 364/240; 364/240.2; 364/259.9; 364/232.93; 364/DIG. 1
[58] Field of Search ... 364/200 MS File, 900 MS File

[56] References Cited

U.S. PATENT DOCUMENTS

| 3,631,401 | 12/1971 | Dinman | 364/200 |
| 3,962,685 | 6/1976 | Belle Isle | 364/200 |
| 3,983,539 | 9/1976 | Faber et al. | 364/200 |
| 4,346,435 | 8/1982 | Wise | 364/200 |
| 4,434,460 | 2/1984 | Drakenburn et al. | 364/200 |
| 4,623,964 | 11/1986 | Getz et al. | 364/200 |
| 4,704,678 | 11/1987 | May | 364/200 |
| 4,918,596 | 4/1990 | Nakano | 364/200 |
| 4,928,223 | 5/1990 | Due et al. | 364/200 |
| 4,928,224 | 5/1990 | Zulian | 354/200 |

Primary Examiner—Thomas C. Lee
Assistant Examiner—William M. Treat
Attorney, Agent, or Firm—Finnegan, Henderson, Farabow, Garrett and Dunner

[57] ABSTRACT

According to a processing apparatus with a hierarchical structure, a machine instruction has a hierarchical structure of a task level operation code, a control structure level operation code, an arithmetic level operation code and a low order level operation code, and accordingly an operation object field has a hierarchical structure of task level data, control condition data, arithmetic object data and low order level data. In correspondence with the hierarchical structure of the instruction, the processing apparatus has a hierarchical structure of task level functional blocks, control structure level functional blocks, arithmetic level functional blocks and low order level functional blocks. The functional blocks respectively have instruction decoders which are operated with serial or parallel processing.

4 Claims, 32 Drawing Sheets

ALL DYNAMIC MICROPROCESSOR

ALL STATIC MICROPROCESSORS

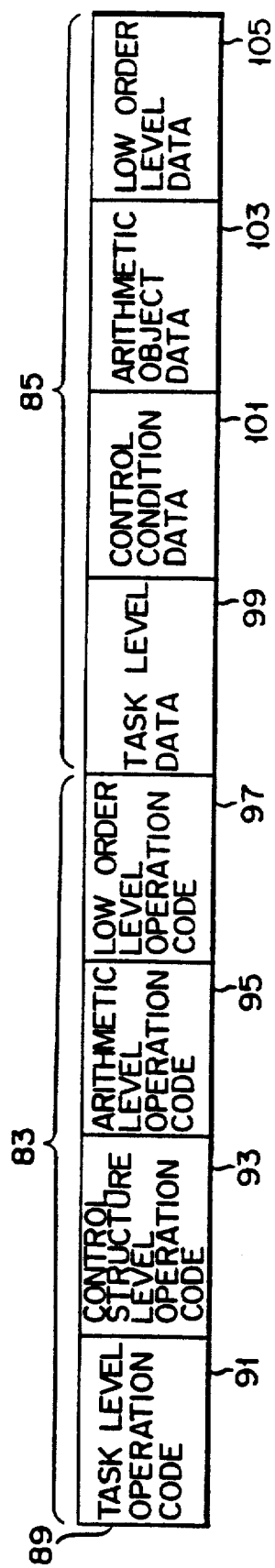
F I G. 15
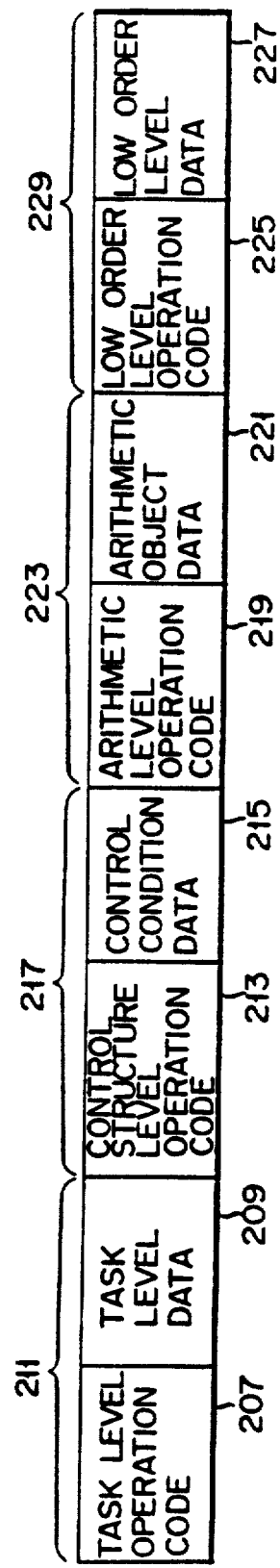
F I G. 18

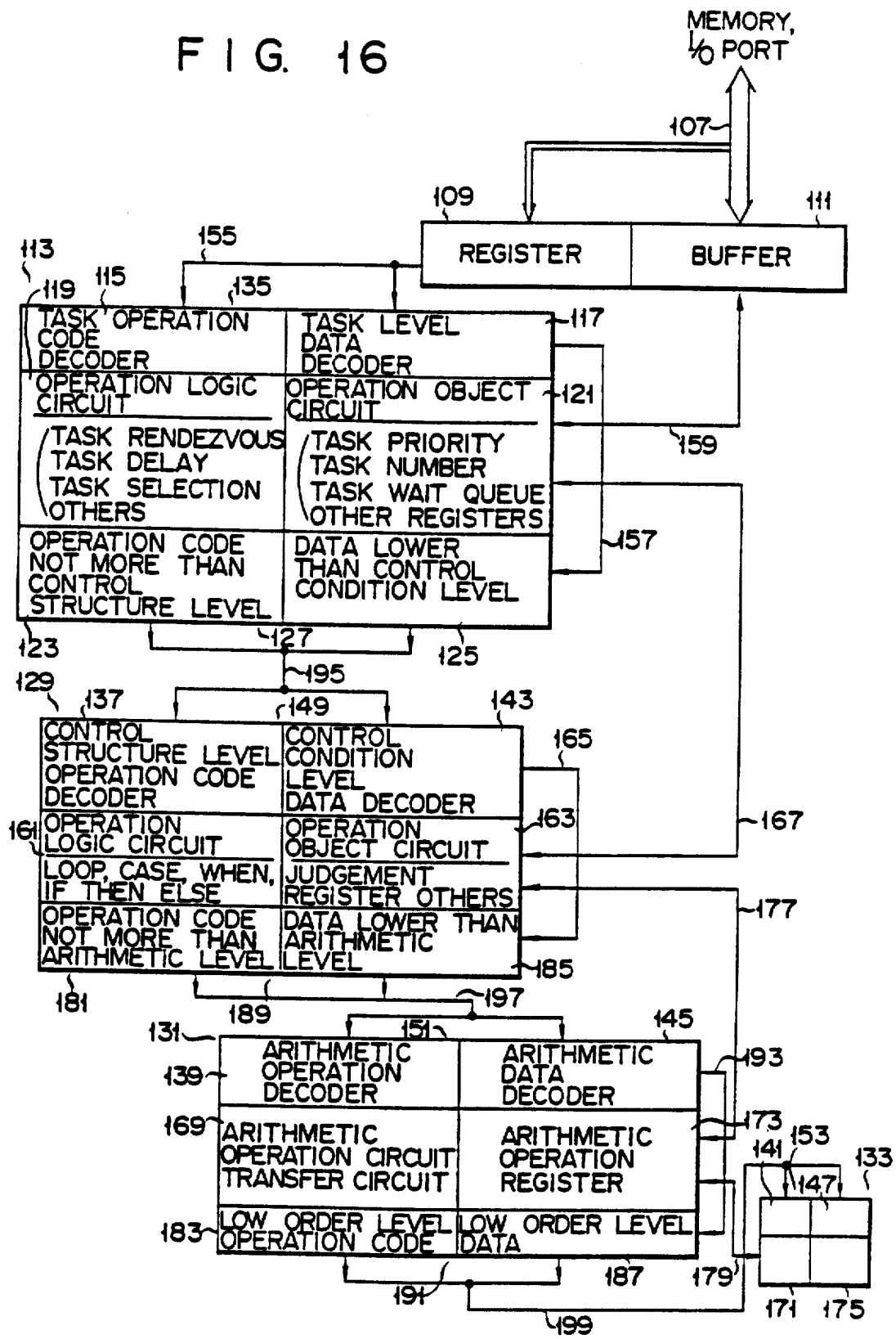

FIG. 17

```
task body ELECTRIC-POWER GENERATION CONTROL
loop
    READ OUTPUT FREQUENCY
    select
        when FREQUENCY IS EQUAL TO OR LOWER THAN 380HZ
            accept INCREASE OF REVOLUTION                          ⌐201
                                                         ⌐203
                while TIMER COUNTER < 10 SECONDS
                loop
                    OPEN FUEL VALVE FURTHER (ONE SECOND);
                    TIMER COUNTER := TIMER COUNTER + 1
                end loop                                  ⌐205
                RETURN FUEL VALVE TO ORIGINAL POSITION
            end INCREASE OF REVOLUTON                     ⌐203
        or
        when FREQUENCY IS EQUAL TO OR HIGHER THAN 420HZ
            accept DECREASE OF REVOLUTION                ⌐203  ⌐201
                while TIMER COUNTER < 10 SECONDS
                loop
                    CLOSE FUEL VALVE (ONE SECOND);
                    TIMER COUNTER := TIMER COUNTER + 1
                end loop                                  ⌐205
                RETURN FUEL VALVE TO ORIGINAL POSITION
            end DECREASE OF REVOLUTION                    ⌐203
    end select
end loop
end ELECTRIC-POWER GENERATION CONTROL
```

F I G. 19
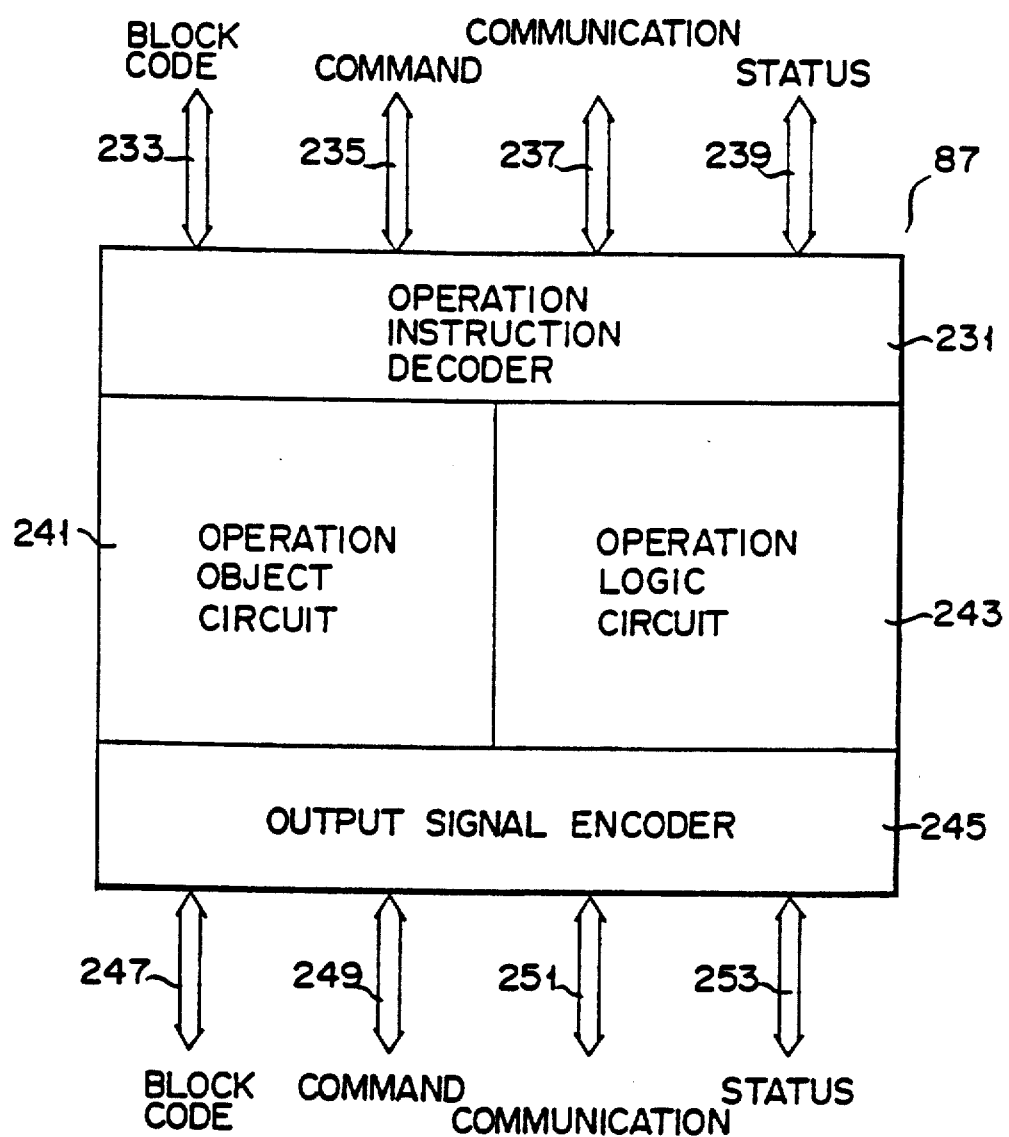

F I G. 20
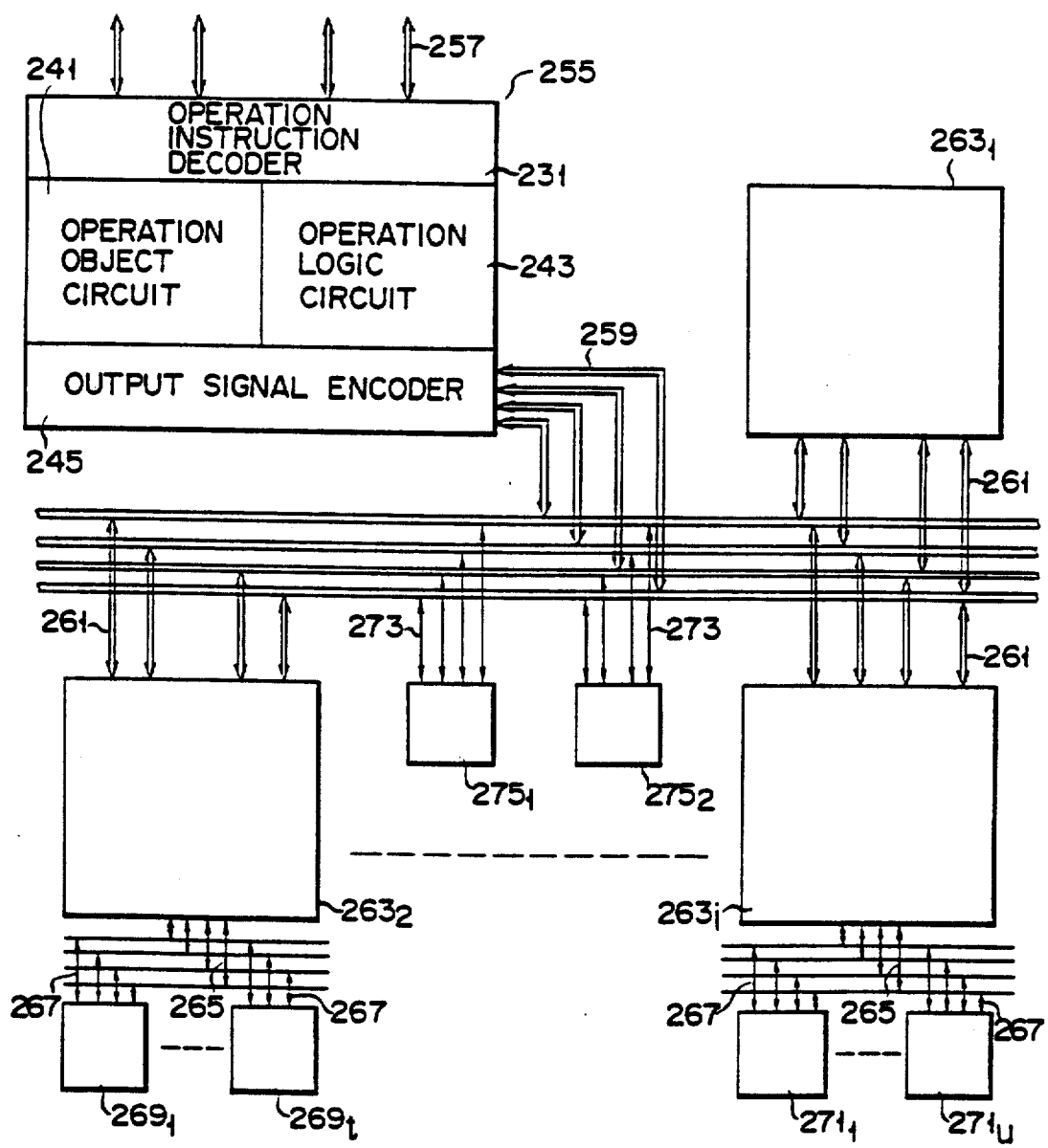

FIG. 30A (PRIOR ART)

| L | R1 | ADDRESS OF PARAMETER A |

FIG. 30B (PRIOR ART)

| A | R1 | ADDRESS OF PARAMETER B |

FIG. 30C (PRIOR ART)

| ST | R1 | ADDRESS OF PARAMETER C |

FIG. 31

| BIT STRING DESIGNATING ARITHMETIC OPERATION LEVEL | OPERATION CODE FOR ADDITION | ADDRESS OF PARAMETER A | ADDRESS OF PARAMETER B | ADDRESS OF PARAMETER C |

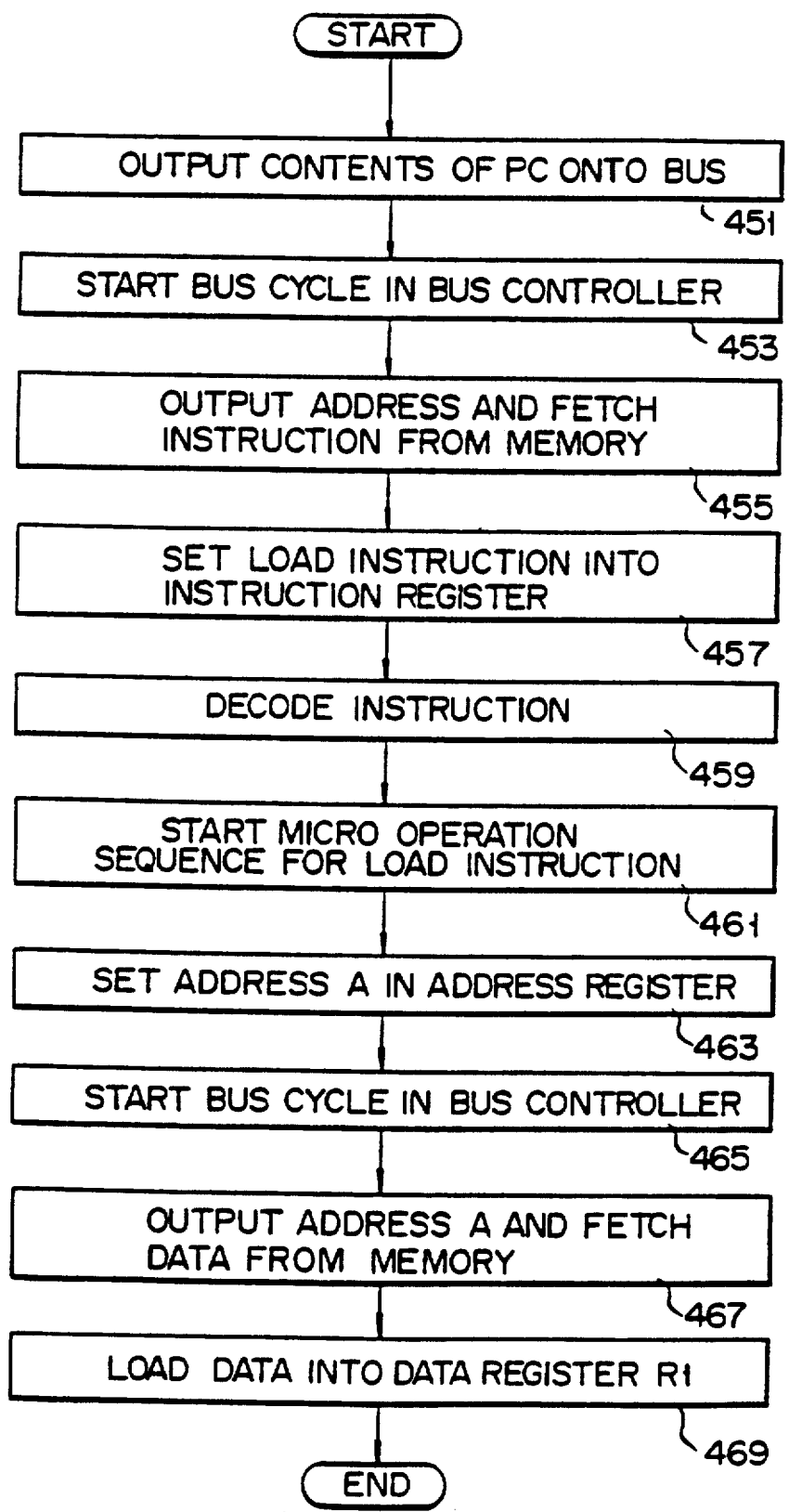

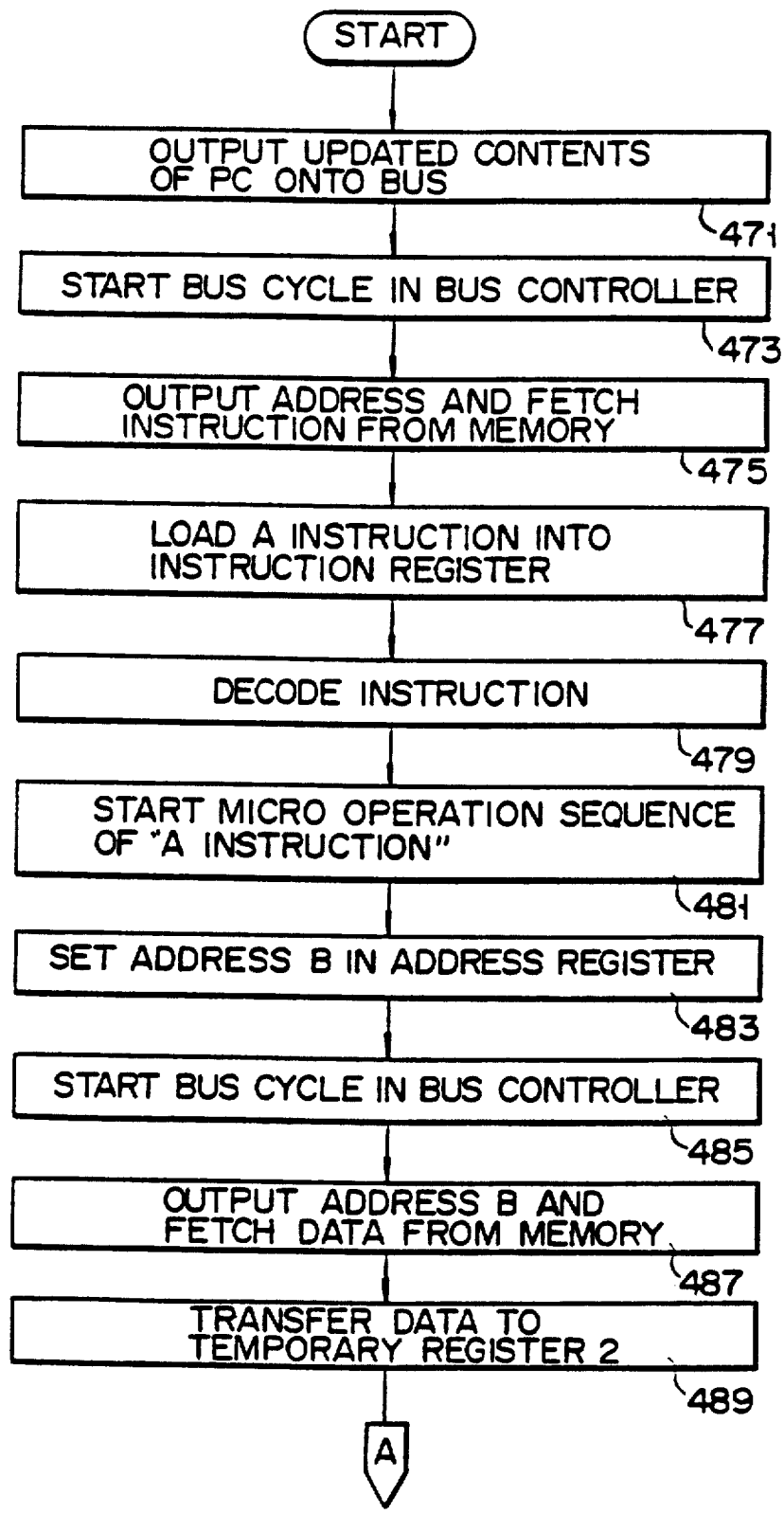

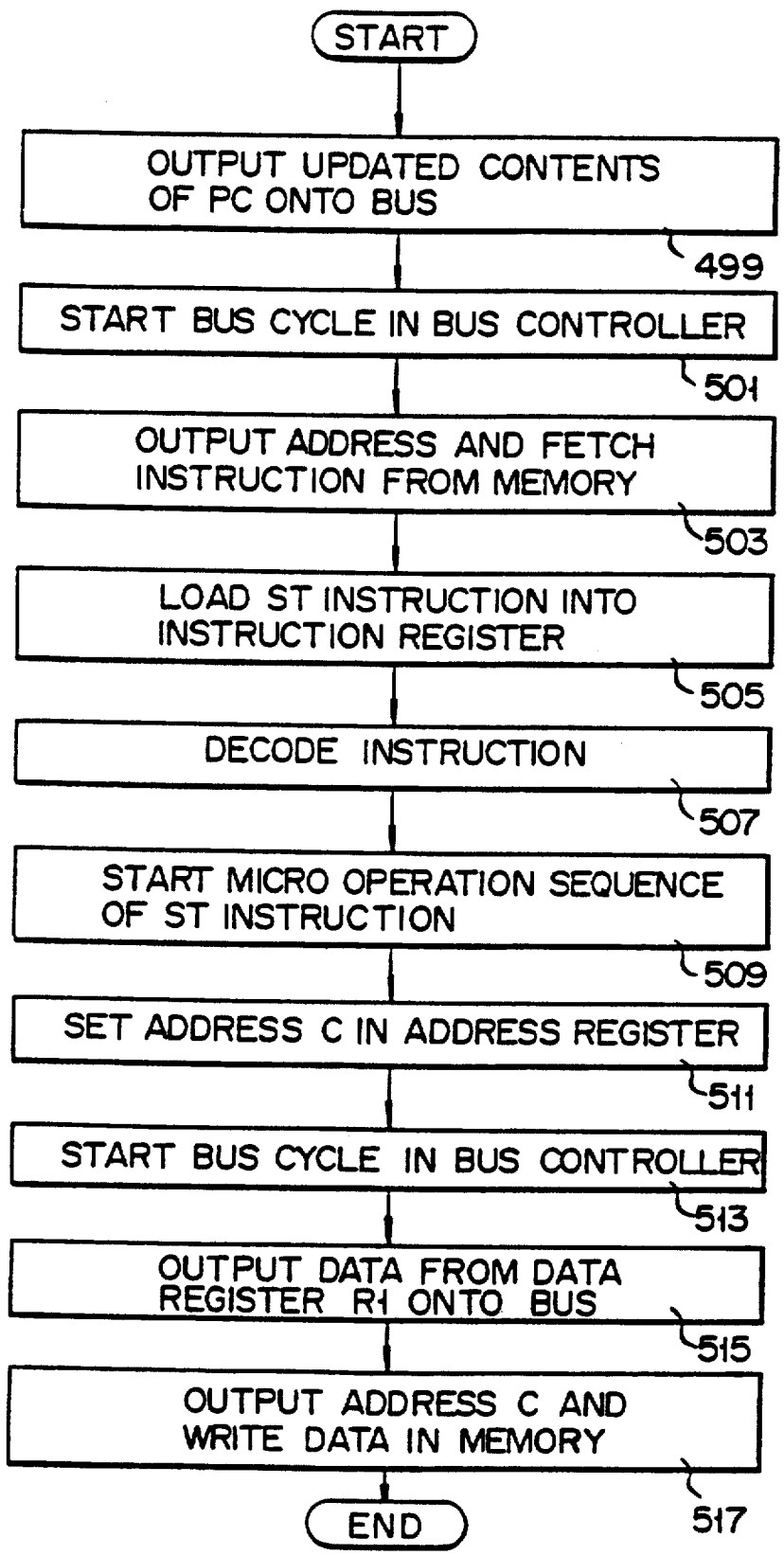

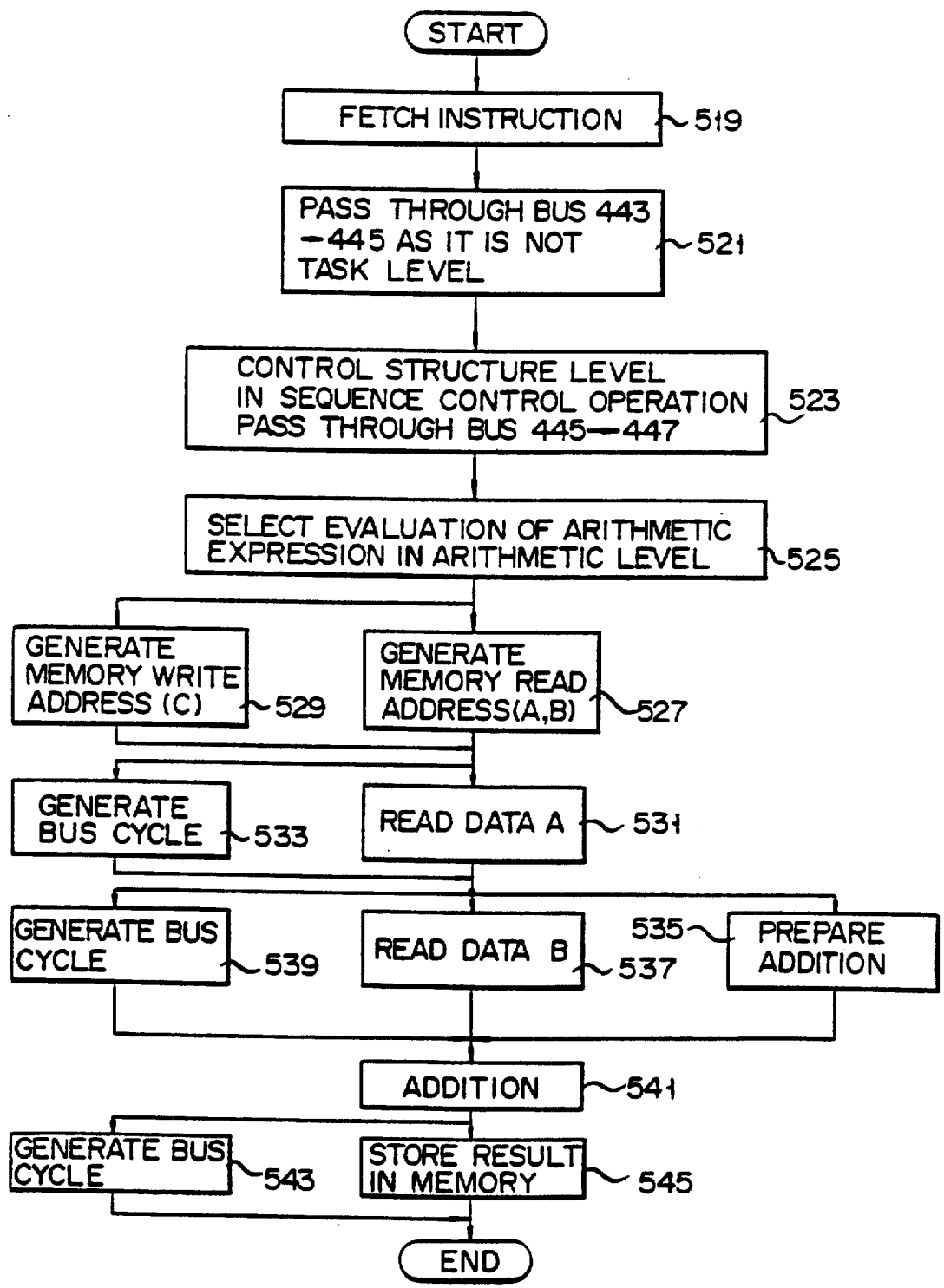

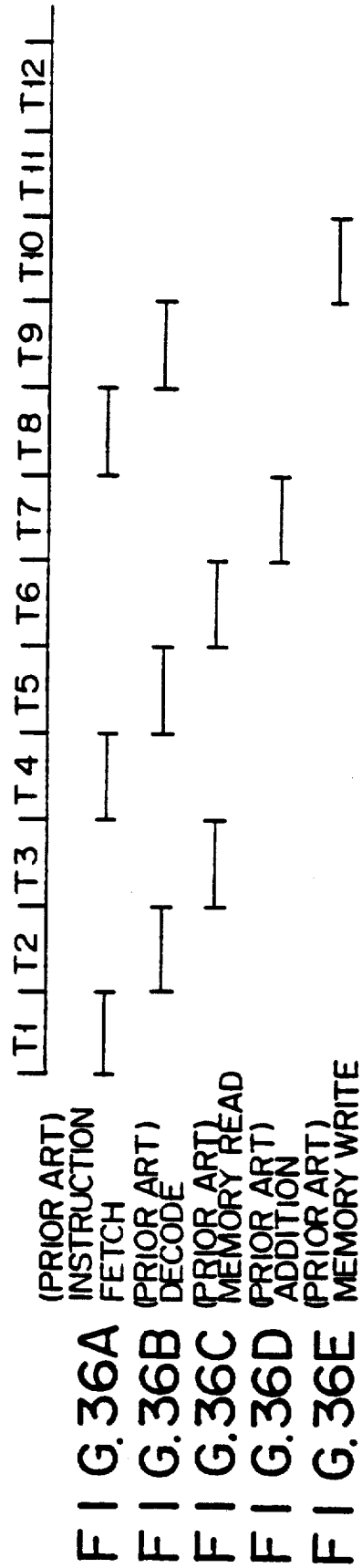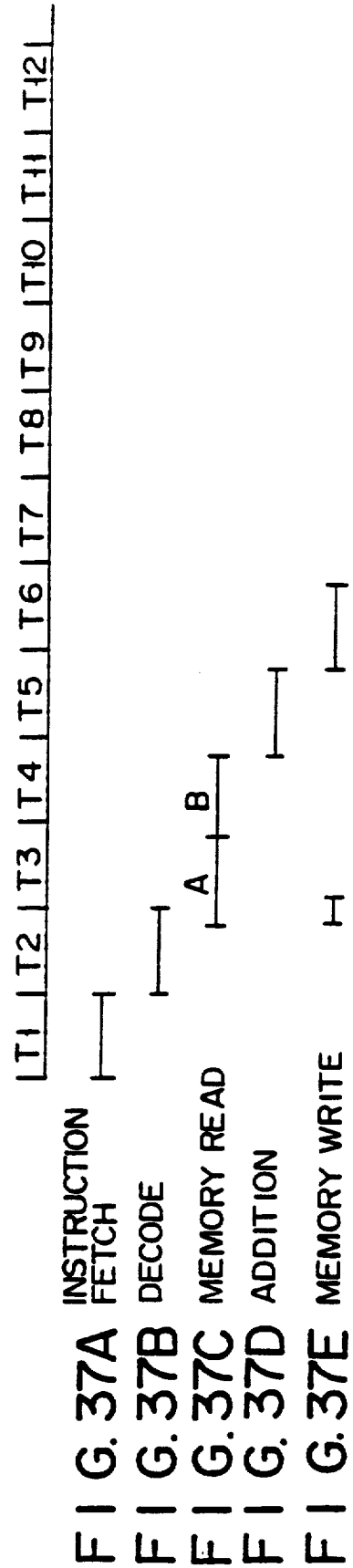

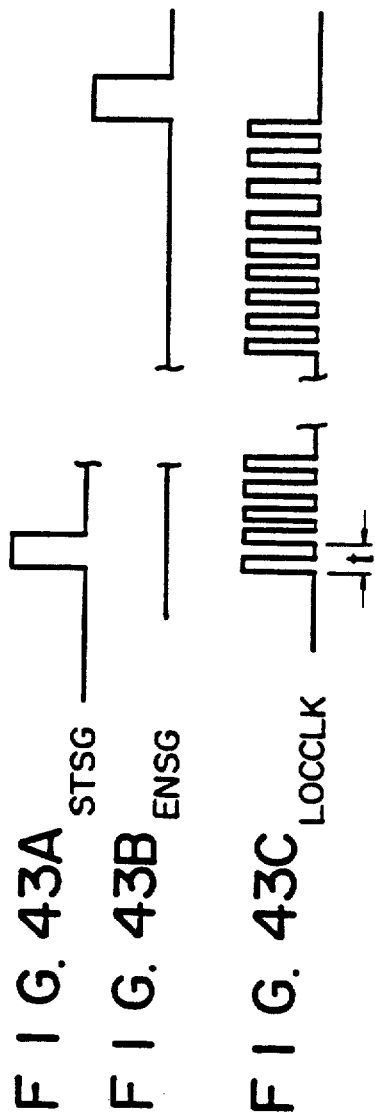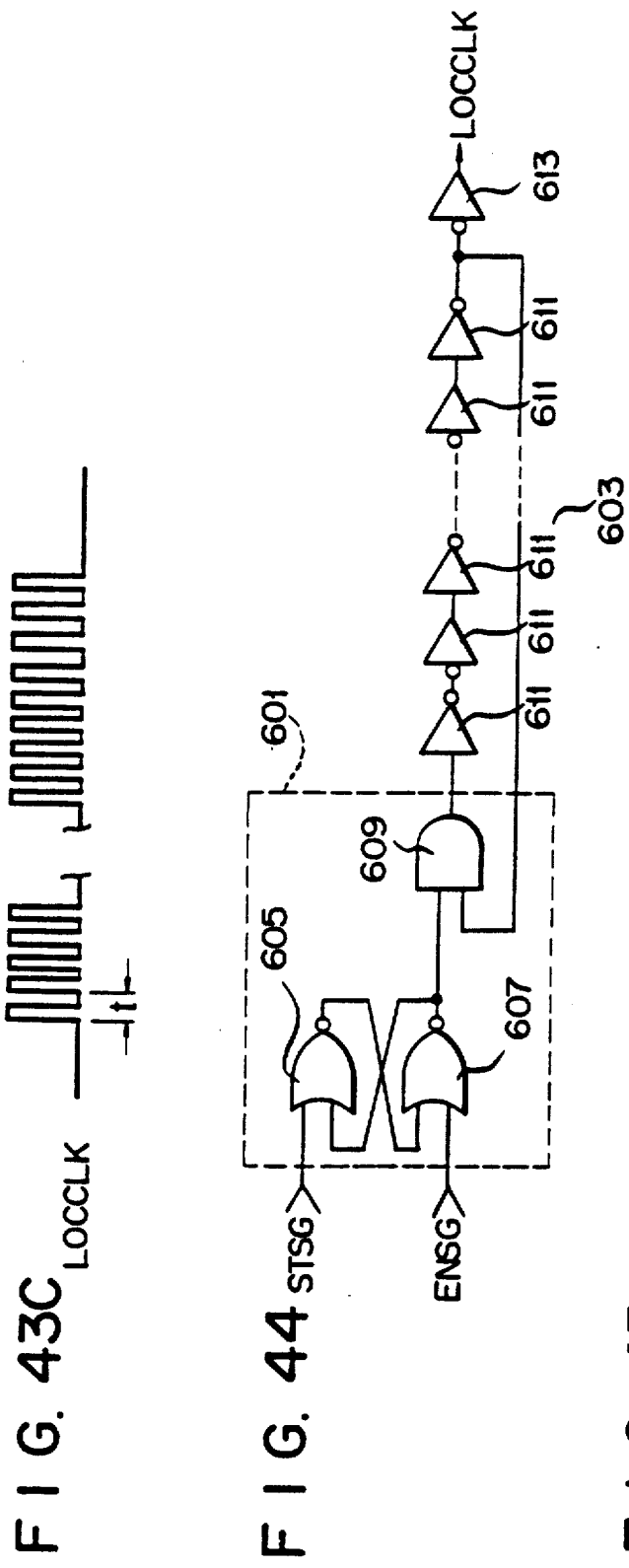
FIG. 43A STSG
FIG. 43B ENSG
FIG. 43C LOCCLK
FIG. 44
FIG. 45

PROCESSING APPARATUS WITH FUNCTIONAL HIERARCHICAL STRUCTURE USING CORRESPONDING HIERARCHICAL MACHINE INSTRUCTION FIELDS

This is a division of U.S. application Ser. No. 06/720,881, filed Apr. 8, 1985, U.S. Pat. No. 4,901,225.

BACKGROUND OF THE INVENTION

The present invention relates to a processing apparatus such as a high-performance microprocessor.

Various types of very large scale integration (VLSI) microprocessors have been proposed along with the recent development of microcomputers. However, a VLSI microprocessor for software engineers, i.e., a VLSI microprocessor compatible with system development software has not yet been proposed.

A central processing unit (CPU) preferably transfers and processes (logic and arithmetic operations) data and deals with decision blocks of a flow to satisfy the needs of a user. With a conventional microprocessor, the internal structure is not hierarchical. In addition, a low order level machine language is mainly used such that a programmer must access registers in the VLSI microprocessor, which is far from what the programmer really wants to perform. Although some conventional microprocessors have high order level instructions, these instructions cannot be constructed systematically with low order level instructions. Thus, almost of conventional microprocessors have instructions with a so-called semantic gap.

In the computer industry, there are strong demands for improvement of software productivity and reliability (high quality). These demands can be rapidly satisfied by high-class procedures such as system specification definitions, system analysis, system design and software design. However, the programming required to achieve high performance and higher functions of the VLSI microprocessors is complicated since machine instructions are low order level. As a result, many bugs tend to occur. In order to solve problems of such programming, hierarchical programming techniques and corresponding system description languages are proposed. Typical examples are Pascal, C, PL/M and the like. A strong Ada language is being put into practice. However, since compilers of these languages translate the languages into machine languages of given microprocessors, memory usage efficiency is slightly degraded and the processing rate is slightly decreased. Under these circumstances, in industrial systems (FA or factory automation, including industrial robots) which comprise microprocessors, there are few programmers who wish to create control programs by system description languages. Although most of the basic software packages require a maximum use of highly reliable tools such as operating systems and compilers, these packages are written by assembler languages greatly influenced by the internal structure of the microprocessors. Therefore, a demand has arisen for development of a microprocessor wherein intermediate codes of the system description language are directly processed as the machine language.

FIG. 1 is a block diagram showing a general configuration of a conventional microprocessor. This microprocessor comprises an external address bus 3, an external data bus 5, an external control bus 7, an internal data bus 9, a machine instruction bus 11, bus control logic circuits 13, an address register file 15, an instruction register 17, an instruction decoder 19, a micro operation sequence control logic circuit 21, a data register file 23 and an ALU 25. With the above configuration, the register 17 fetches an instruction from the bus 5 through the bus 11. The instruction fetched by the register 17 is decoded by the decoder 19, and the decoded result is supplied to the circuit 21. The circuit 21 comprises a programmable logic array (PLA) for generating micro operation instructions. The circuits 13, the file 15, the register 17, the decoder 19, the file 23, and the ALU 25 are controlled by the micro operation instructions sequentially generated by the circuit 21. The ALU 25 receives data through the bus 9 under the control of the circuit 21 and processes the received data. The resultant data is sent onto the bus 9.

In the conventional microprocessor, a machine instruction fetched by the register 17 comprises an operation code field 27 and an operand field 29, as shown in FIG. 2. The operation code in the field 27 is flatly assigned to an operation code table. The operand field 29 stores physical objects such as addresses of areas for storing data such as immediate data or data as objects for the registers and operation objects. A bit pattern of the machine instruction expressed by these fields is read out from the register 17 and is decoded by the decoder 19.

However, in the conventional microprocessor wherein the bit pattern of the machine instruction is read out from the register 17 and is decoded and executed, the following drawbacks are presented when high performance is required:

i) Since a machine instruction is simply subjected to semantic assignment and not classified into functional blocks, the circuit 21 and the decoder 19 for decoding the instruction read out from the register 17 must have a complicated arrangement when a high order level instruction is to be executed. As a result, time and cost for design, check and evaluation are increased.

ii) The operand field is an object data type and is not abstracted, and physical registers, memories and port address generation mechanism in the microprocessor are designated by a user. For this reason, the operand field has a weak association with an operation type of the machine instruction, and the object data type is present independently of the operation type. As a result, a physical register number and an internal data bus width must be selected and a general-purpose circuit block must be modified for a designated usage so as to perform a specific operation such as addition of integers. The micro operation sequence becomes complicated, and the number of signal lines to be controlled by the micro operation instruction is increased. In addition, since microprogramming must be performed, the circuit 21 for storing a micro operation sequence in correspondence with the machine instruction must have a large size and the signal lines are excessively concentrated on the circuit 21. This means that a number of signal lines run parallel in a single chip. Furthermore, since the size of the circuit 21 is greatly increased, the layout of elements in the chip is greatly limited. As a result, interwiring between the circuit blocks becomes difficult. iii) In order to improve a model or develop microprocessors of the same family or a high-performance microprocessor, various circuit blocks, a micro operation sequence, various types of control logic which are indispensable for such development and the wiring for connecting these circuits must be designed and arranged each time since a hierarchical structure is not provided. As a result, an available function library is not prepared. iv) High reliability is often required to create a high-performance system such as a real-time multiple parallel processing system. In this case, it is dangerous to allow an assembler program which is not easily understood and is sophisticated. Under this condition, it is also difficult to make a further improvement and proper maintenance. In order to overcome these drawbacks, system description languages such as Pascal, C and Ada have been recently proposed. Since the microprocessor has the above drawbacks, a highly efficient machine instruction sequence cannot be easily created by a compiler programmer. Conventional microprocessors are not inherently compatible with these system description languages and large system configuration.

When the conventional microprocessor having the configuration shown in FIG. 1 is formed on a single chip, the files 15 and 23, the ALU 25, the register 17 and the like are formed on the chip first. The various machine instruction functions are forcibly performed by the decoder 19 and the circuit 21. In this case, the hierarchical functional blocks are not provided. The decoder 19 and the logic circuit 21 are sophisticated to decrease the chip size. It is expensive and time-consuming to design and test the system and expand and modify its functions.

In particular, the program cannot be easily understood except by the copy writer himself, and the technical contribution to organizations and society is small. Even if the program is based on known techniques, it can be regarded as a unique invention, thereby precluding technical development and popularity.

Control signal exchange between the circuit 21 and other components becomes excessively congested when high-performance is to be achieved. The length and space of wiring in the chip are increased. In addition, when high performance is achieved, a PLA constituting the circuit 21 must have a large size, and interwiring between the respective components is difficult. In addition, each random logic for directly controlling the corresponding component must be modified when a microprocessor with new functions is designed and manufactured, resulting in large losses in time and cost.

FIG. 3 is a block diagram showing the general configuration of a conventional microprocessor. A microprocessor 31 comprises an external bus 33, a bus control section 35, a bus switching controlling section 37, a machine instruction bus 39, an instruction register 41, an instruction decoder 43, a micro operation sequence control logic circuit 45, random control logic circuits 47, internal data buses 49 and 51, address registers 53, data registers 55, temporary registers 57, an ALU 59 and flags 61.

In the microprocessor 31, an instruction is fetched from the bus 33 to the register 41 through the sections 35 and 37 and the bus 39. The instruction stored in the register 41 is decoded by the decoder 43, and a decoded result is supplied to the circuit 45. The circuit 45 comprises a programmable logic array (PLA) for generating a micro operation instruction. The circuits 47 are controlled in response to the micro operation instruction. The circuits 47 constitute parts of the section 35, the decoder 43, the registers 53, 55 and 57 and the ALU 59 which are controlled when the circuits 47 are controlled.

The circuit 45 stores a number of sequences which are of different type and function level so as to cause the sequences to interfere with each other (i.e., parts of the sequences are commonly used). Upon operation of the micro instruction as an output from the circuit 45, a discrete physical data structure is accessed through the circuits 47, and control operation continues in a strong association with the random control logic circuits in the section 35.

In the microprocessor described above, since the system design of hierarchical functional blocks is not established in accordance with the operation specifications, the circuit blocks are weakly independent of each other. Physical low order level blocking such as blocking for registers, buses, switching circuits, selectors, encoders and decoders is performed. These blocks are entirely controlled by the circuit 45.

The operating time of each circuit block, and a relationship with another circuit block for exchanging resources such as data, a control signal, a status signal, and a clock signal which are generated during the operation cannot be solely determined. For this reason, it is difficult to effectively achieve increases in operating speed and yield in the system design level.

When a high-performance VLSI microprocessor is developed, changes in micro operation sequence and data structure strongly interfere with another block. It is difficult to design and test products, resulting in a long development period and high cost.

For example, FIGS. 4 and 5 show examples of a controlled status of the conventional microprocessor. Referring to FIG. 4, when a system as a target to be controlled is defined as C, a plurality of controlling systems A and B are provided to control the system C. In addition to this drawback, the systems A and B greatly interfere with each other. However, referring to FIG. 5, a controlled system C is directly operated by a single controlling system D. The system D is driven by a plurality of controlling systems A and B. In the same manner as in the case of FIG. 4, the system C is operated in accordance with the status of the systems A and B. It should be noted that each controlling system comprises a logic section 63 and a status storage section 65. The situation is more crucial since the status storage of the system C is not locally but directly updated by the systems A, B and D. For this reason, a slight modification is made for not only the timing of the system C but also the function thereof. As a result, the operation of the system C cannot be stably estimated.

As is apparent from the above description, it is very difficult to design a system wherein the operating speed and the yield of products are effectively increased in the system design level and to test the finished products. In addition, the development period is prolonged and the manufacturing cost is high.

Furthermore, the conventional microprocessor ICs are classified into an all dynamic microprocessor in which the internal system comprises dynamic memory circuits 67 and control/judgement circuits 69, as shown in FIG. 6, and an all static microprocessor in which the internal structure comprises static memory circuits 71 and control/judgement circuit blocks 73, as shown in FIG. 7. As shown in FIG. 8, each circuit 67 has an input read-in gate 75 and an output enable gate 77. Each of the gates 75 and 77 comprises a clocked inverter circuit 79 shown in FIG. 10. Each static memory circuit 71 comprises an input read-in gate 75, an output enable gate 77, a clocked inverter 80 and an inverter 81, as shown in FIG. 9.

Among the conventional microprocessors having the arrangements described above, the all dynamic microprocessor has a smaller number of elements than that of the all static microprocessor. More specifically, six elements are omitted from each circuit of the all dynamic microprocessor as compared with the number of elements of each circuit of the all static microprocessor. The chip size of the all dynamic microprocessor is smaller than that of the all static microprocessor, thereby decreasing the manufacturing cost. However, the all dynamic microprocessor has a narrow operating frequency range. In addition, when the clock is disabled, an operational error often occurs.

The all static microprocessor has a wide operating frequency range and is properly operated even if the clock is disabled, thereby decreasing power consumption. However, the number of elements of the all static microprocessor is larger than that of the all dynamic microprocessor. Therefore, the chip size of the all static microprocessor is larger than that of the all dynamic microprocessor, resulting in high cost.

When the dynamic and static microprocessors are used together, the operation timings of the system as a whole are very complicated, resulting in inconvenience.

SUMMARY OF THE INVENTION

It is an object of the present invention to provide a highly reliable, low-cost processing apparatus wherein high performance can be easily achieved, the development period and cost can be decreased, dense wiring can be avoided, and tests can be easily performed.

It is another object of the present invention to provide a practical means for hierarchically coupling functional blocks, each having a single function so as to satisfy the required specifications, wherein functions to be performed and operation timings can be determined and can be independent of each other, and hence to provide a processing apparatus wherein an operating speed and a yield can be increased, low power consumption can be achieved, and a chip size of a microprocessor IC can be decreased.

It is still another object of the present invention to provide a CMOS microprocessor which has a wide frequency range, low power consumption and a relatively small chip size.

In order to achieve the above objects of the present invention, there is provided a processing apparatus wherein hierarchical structures are provided in a machine instruction code operation field and an operand field, a microprocessor is constituted by a plurality of functional blocks as the hierarchical structure, an instruction decoder is arranged in each functional block, and a required operation is performed within each block.

Furthermore, high order level functional blocks are connected to low order level functional blocks through buses which comprise a block code bus for transmitting a code for discriminating the functional block, a command bus for transmitting an instruction code of the operation of the functional block, a communication bus for transmitting input data or output data with respect to the functional block and a status bus for transmitting current status of a given functional block to other functional blocks and the instruction accept status. Bus drivers comprising a block code bus driver, a command bus driver, a communication bus driver and a status bus driver are arranged to exchange codes or data between the buses and an external circuit. The four drivers are arranged at four corners of the chip. The highest order level functional block is arranged near the command bus driver and the block code bus driver. The higher order level functional blocks immediately below the highest order level block are arranged in the peripheral portion of the chip. The lowest order level functional block is arranged at the center of the chip. The buses run along the four sides of the chip between the higher order level functional blocks and low order level functional blocks in such a manner that the buses associated with higher order level functional blocks are arranged in the peripheral portion of the chip, and the buses associated with lower order level functional blocks are arranged near the center of the chip.

The required specifications of the processing apparatus are hierarchically classified into blocks such as a task level, a control structure level, an arithmetic level and a low order level lower than the arithmetic level so as to cause the classification to be compatible with a system description language. In addition, the range of the processing functions and the operating time of each order level functional block is narrower than that of a higher order level block. A control gate circuit is arranged for each functional block to exchange necessary signals and data for a necessary period of time when a high order level functional block causes a low order level functional block to operate. The data storage circuit and the timing control circuit in each functional block comprise dynamic circuits which are operated only when the corresponding block is active.

The microprocessor is divided into hierarchical functional blocks, and a time-linear dynamic memory circuit is assigned to each block in accordance with the operating time of each block. At the same time, interblock data (or a signal) and return data in the memory location (within a high order level module) are assigned by a time-linear dynamic memory circuit capable of storing the data exceeding the operating time of the high order level module or by a static memory circuit (for especially the highest order level module). In addition, the timing clocks are locally generated by a timing generator, thereby providing a wide operating frequency range (an external clock) and guaranteeing proper operation.

BRIEF DESCRIPTION OF THE DRAWINGS

Other objects and features of the present invention will be apparent from the following description taken in connection with the accompanying drawings, in which:

FIG. 15 shows a format of one machine instruction code used in the processing apparatus of the present invention;

FIG. 16 is a detailed block diagram showing the functional blocks of FIG. 13;

FIG. 17 is a representation for explaining an Ada description model so as to best understand the present invention;

FIG. 18 shows a format of another machine instruction code corresponding to that of FIG. 15;

FIG. 19 is a detailed block diagram showing functional blocks of FIG. 13;

FIG. 20 is a block diagram of a microprocessor using the functional blocks of FIG. 19 according to an embodiment of the present invention;

FIGS. 30A through 30C respectively show conventional instruction formats of additions;

FIG. 31 shows an instruction format for an addition used in the processing apparatus with a hierarchical function structure;

FIGS. 32 through 34 are respectively flow charts for explaining an addition according to a conventional technique;

FIG. 35 is a flow chart for explaining an addition performed in the processing apparatus with a hierarchical function structure;

FIGS. 36A through 36E are respectively timing charts for explaining the conventional addition;

FIGS. 37A through 37E are respectively timing charts for explaining the addition according to the present invention;

FIGS. 43A through 43C are respectively timing charts of various timing signals generated from the timing signal generator shown in FIG. 42;

FIG. 44 is a detailed block diagram of the local oscillator of FIG. 42;

FIG. 45 shows a format of still another instruction used in the present invention.

DETAILED DESCRIPTION OF THE PREFERRED EMBODIMENTS

Figure 11:
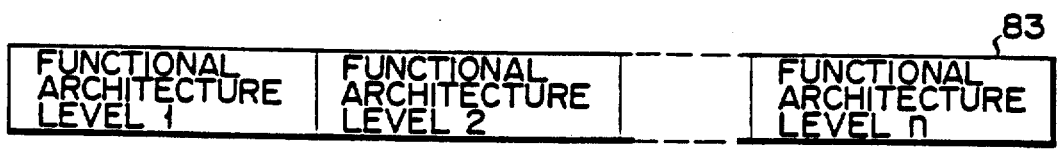
FIG. 11 shows a format of an operation code field of a machine instruction used in the present invention.
Figure 12:
FIG. 12 shows a format of an operand field used in the present invention.
Figure 13:
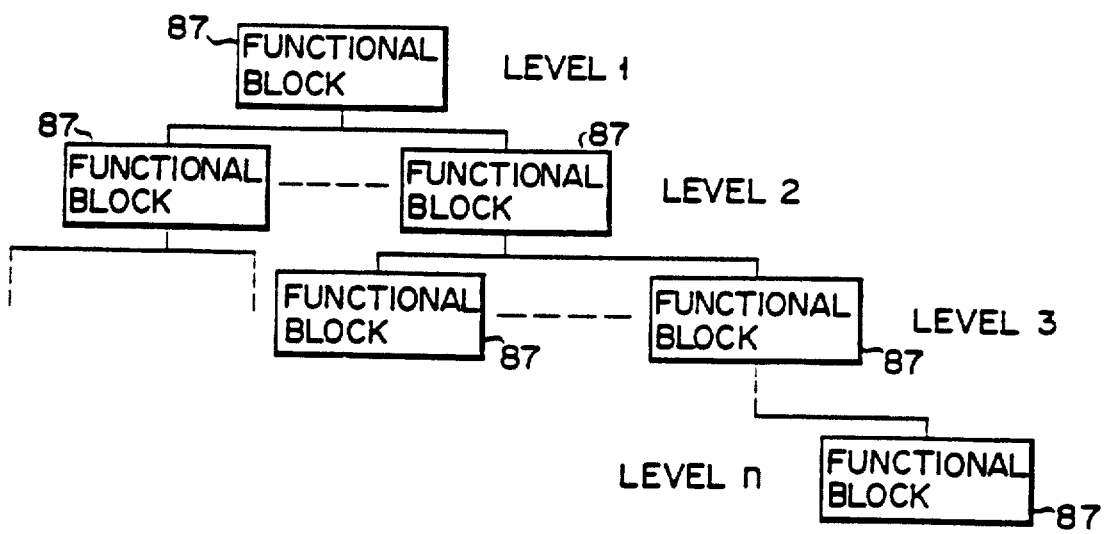
FIG. 13 is a functional block diagram of a processing apparatus of the present invention.
Figure 14:
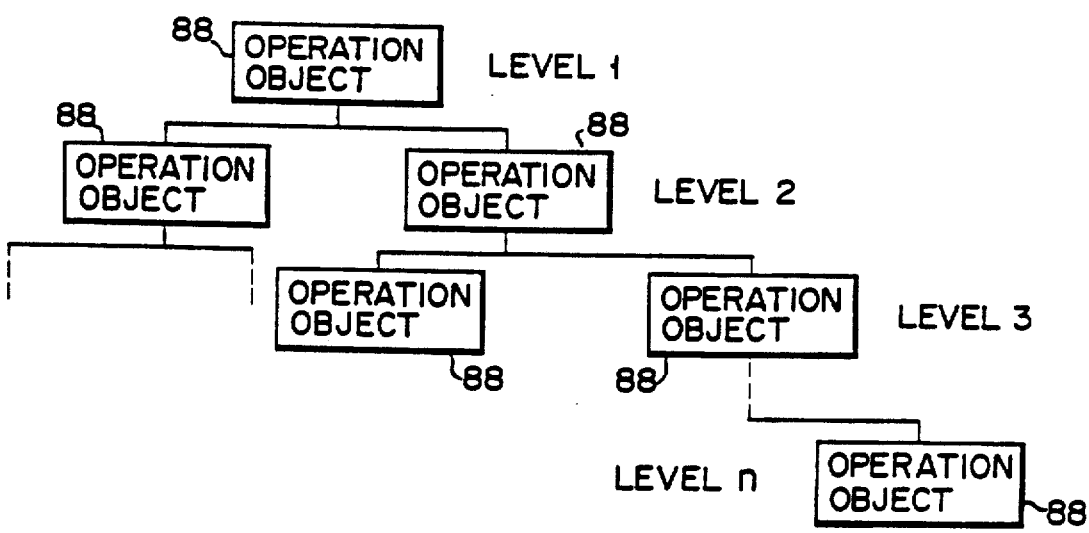
FIG. 14 is a functional block diagram of an operation object of the processing apparatus of the present invention.

An instruction format used in a processing apparatus such as a microprocessor with a hierarchical structure has a hierarchical structure, as shown in FIGS. 11 and 12. Referring to FIG. 11, an operation code field 83 is divided into functional hierarchical levels from level 1 as the highest level to level n as the lowest level. As shown in FIG. 12, an operation object or operand field 85 is also divided into n data structure levels from level 1 as the lowest level to level n as the highest level. As shown in FIG. 13, the processor unit has a hierarchical structure which comprises a plurality of functional blocks 87 whose number corresponds to the number of levels of the operation code field. As shown in FIG. 14, the number of levels of operation objects 88 arranged in the hierarchical structure is the same as that of the levels in the operation object field.

FIG. 15 shows one machine instruction code as a combination of the operation code field 83 of FIG. 11 and an operation object field 85 of FIG. 12. This instruction code 89 comprises: the operation code field 83 consisting of a task level operation code 91, a control structure level operation code 93 as a level lower than the task level, an arithmetic level operation code 95 lower than the control structure level and a low order level operation code 97 lower than the arithmetic level; and the operation object field 85 consisting of task level data 99, control condition data 101 lower than the task level, arithmetic object data 103 lower than the data 101 and low order level data 105 lower than the arithmatic object data. In other words, the code 89 is given when n in the operation code (FIG. 11) and the operation object code (FIG. 12) is 4. The levels of the code 89 are the task level, the control structure level, the arithmetic level and the low order level. It should be noted that the arithmetic object data includes arithmetic data and logic data.

FIG. 16 is a detailed block digram of a microprocessor having a plurality of blocks 87.

Referring to FIG. 16, a data bus 107 connects a microprocessor and a memory (not shown) and an I/O port (not shown) or the like. A register 109 stores a machine instruction code with a hierarchical structure shown in FIG. 18 received through the bus 107. A buffer 111 stores data with a hierarchical structure shown in FIG. 18. A machine instruction code from a memory (not shown) and an I/O port (not shown) is supplied to the register 109 through the bus 107. The data having a level lower than the task level are transferred between the side of the memory and the I/O port and the side of the buffer 111. A task level functional block 113 has a task operation code decoder 115 and a task level data decoder 117. The decoder 115 decodes a task level operation code supplied from the register 109 to operate an operation logic circuit 119. The circuit 119 comprises blocks of a task rendezvous function for synchronizing the operations between tasks, a task delay function for executing the task after a predetermined period of time has elapsed, and a task selection function for selecting any task. In practice, m task level functional blocks 113 each having the above functions are provided, but only one block 113 is shown for illustrative convenience. A necessary function among LOOP, CASE, WHEN, IF-THEN-ELSE-, subprogram access, and other processing functions of each of control structure level functional blocks 129 is selected for each of the blocks 113. A necessary function among an arithmetic operation function, a logic operation function, a data transfer function and other processing functions of each of p arithmetic level functional blocks 131 is selected for each of the blocks 129. A necessary function among the functions of each of q low order level functional blocks 133 can be selected for each of the blocks 131.

A machine instruction code decoder 135 having a task operation code decoder 115 and a task level data decoder 117 is arranged at the input stage of each block 113. Machine instruction code decoders 149, 151 and 153 which respectively comprise a set of an operation code decoder 137 and a data decoder 143, a set of an operation code decoder 139 and a data decoder 145 and a set of an operation code decoder 141 and a data decoder 147 are arranged in input stages of functional blocks 129, 131 and 133 of the control structure level, the arithmetic level and the low order level, respectively. The machine instruction code stored in the register 109 is supplied to the decoder 135 in the block 113 of the task level as the highest order level through a signal line 155. A machine instruction code is supplied from a functional block having a level higher than the task level to the decoders 149, 151 and 153 of those low order level blocks.

In the blocks 113, 129, 131 and 133 of each functional level, the decoders 135, 149, 151 and 153 generate decoded outputs which represent operations to be executed in the corresponding functional blocks.

Each functional block of the task level comprises an operation logic circuit 119 for performing one of the task rendezvous, the task delay, the task selection and other task operations and an operation object circuit 121 made of registers for storing one of task priority data, task number data, task wait queue and the like.

The circuit 119 directly fetches operation object data from the decoder 117 through a signal line 157 in response to a decoded output generated from the decoder 135. Otherwise, the circuit 119 fetches data from a buffer 111 through a signal line 159 by using the decoded output generated from the decoder 117. Desired data processing is performed for the fetched data. The processed result is written in the buffer 111 through the signal line 159.

Each block 129 of the control structure level comprises an operation logic circuit 161 for performing one of the control structure level operations, i.e., LOOP, CASE, WHEN, IF-THEN-ELSE-, subprogram access and other operations, and an operation object circuit 163 having a judgement register or the like. The circuit 161 receives the operation object data from the decoder 149 through a signal line 165 in accordance with the decoded output generated from the decoder 149. Otherwise, the circuit 161 receives data from the block 113 of the task level through a signal line 167 by using the decoded output generated from the decoder 149. A predetermined data operation is performed for the fetched data, and the result is written in the block 113 of the task level as a higher order level by one level through the signal line 167. Similarly, the block 131 of the arithmetic level and each block 133 of each low order level comprise a set of an operation logic circuit 169 and an operation object circuit 173 and a set of an operation logic circuit 171 and an operation object circuit 175, respectively. These circuits are operated in the same manner as the circuits of the block 129 of the control structure level. Signal lines 177 and 179 are arranged between the blocks 129 and 131 of the control structure level and the arithmetic level and between the blocks 131 and 133 of the arithmetic level and the low order level so as to correspond to the signal line 167.

A machine instruction code encoder 127 having an operation code encoder 123 for encoding the operation codes lower than the control structure level and a data encoder 125 for encoding data lower than the control condition level is arranged in the output stage of each block 113 of the task level. Similarly, machine instruction code encoders 189 and 191 having a set of an operation code encoder 181 and a data encoder 185 and a set of an operation code encoder 183 and a data encoder 187 are arranged in the output stages of the blocks 129 and 131 of each of the control structure level, the arithmetic level and the low order level, respectively. The machine instruction code encoder is not arranged in the block 133 of the low order level. When the functional block of a given level uses the functional block of a level lower than the given level, the operation code encoders 123, 181 and 183 encodes the fields which are lower than the levels of their own and which are included in the codes decoded by the decoders 115, 137 and 139, and the instruction codes generated from the circuits 119, 161 and 169, respectively, thereby generating new codes to be given to the lower order level functional blocks. In this case, the encoders 125, 185 and 187 of the respective levels encodes the low order level fields which are lower than the levels of their own and which are included in the codes decoded by the decoders 117, 143 and 145, and data generated from the circuits 119, 161 and 169, respectively, thereby generating new data to be given to the lower order level functional blocks. The machine instruction codes comprising the operation codes and the data which are encoded by the encoders 127, 189 and 191 are supplied to machine instruction code decoders of functional blocks lower by one level through signal lines 195, 197 and 199, respectively.

In the processing control apparatus having the hierarchical structure described above, a machine instruction code shown in FIG. 15 is supplied from a memory (not shown) and an I/O port (not shown) through the bus 107. The task level operation code stored in the register 109 is classified into m data. The m data are supplied together with the lower level operation codes to the m functional blocks 113, respectively. In each of the m task level functional blocks, task processing is performed by the circuits 119 and 121 in response to the decoded output generated from the decoder 115. When task processing is performed, the data stored in the buffer 111 is used as needed.

When a lower order level functional block is used during task processing, the lower order level machine instruction code is produced by the encoder 127 in the block 113. The block 129 which receives the resultant instruction code performs control structure level processing by the circuits 161 and 163 in response to the decoded output generated from the decoder 137. In this case, the data is directly supplied from the block 113 to the block 129 as needed. The processed result is supplied to the block 113. When a lower order level functional block must be used in control structure level processing, the lower order level machine instruction code is produced. This instruction code is used to control the block 131. The block 133 of the low order level can also be controlled in the manner described above.

In the microprocessor according to this embodiment, the operation code fields have a hierarchical structure, and the microprocessor itself is divided into functional blocks having the hierarchical structure. The instruction decoder is arranged in the input stage of the functional block of each level, thereby performing the operation requested in the corresponding block. Therefore, unlike the case wherein the conventional processor using a simple machine instruction code is improved for high performance, the data expression which causes a system failure of a sophisticated, high-performance system can be prevented.

In order to constitute a supersystem as a very large scale integration, the top-down recursive functional decomposition is required. This decomposition is important for a future CAD system. However, as shown in FIGS. 13 and 14, since the functional blocks and the operation objects are constructed in a hierarchical structure, the need for the above can also be satisfied.

A SADT (Structured Analysis and Design Technique) is available from Softech INC., U.S.A. to analyze and design the system requirements specification. In addition, a composite design technique is also proposed by Myers (IBM, U.S.A). The microprocessor of the present invention is highly compatible with the high-class processing of such system development techniques. In addition, when the system is operated by a highly reliable system description language such as Ada, the microprocessor of the present invention can be highly compatible with an Ada description model shown in FIG. 17. FIG. 17 shows an Ada description for a real-time parallel operation for controlling a frequency of a power generator. This description model comprises instructions 201 representing task level functions, instructions 203 representing control structure level functions and instructions 205 representing the arithmetic level functions. In this case, two tasks (i.e., rotational speed increase and decrease; increase and decrease of revolution) are performed when the frequency is less than 380 Hz and more than 420 Hz, respectively. It is also expected that object programming as the compiler output of the Ada language can be effectively performed.

When the processing apparatus with the hierarchical structure is applied to the Ada language, the following instructions can be performed by the task level functional blocks.

```
(i)   Task Start/End Instruction
   task body   task name   (when another task calls for
      begin                this task, it becomes a task
                           start instruction)
   end          task name  (it becomes a task end instruc-
                           tion in response to an object
                           code)
(ii)  Task Delay Instruction (the task execution is
      interrupted (delayed) by designated number of seconds)
      delay         time (sec)
(iii) Rendezvous Instruction (for linking or
      synchronizing the tasks)
   task        task name 1 is
      entry       task entry 1;
      entry       task entry 2;
      .
      .
      .
   end;
   task body   task name 1 is
      .
      .
      .
   begin
      accept      task entry 1 do
                  .
                  . (internal description-executable
                  . statements)
      end         task entry 1;
      .
      .
      .
      accept      task entry 2 do
                  .
                  .
                  .
      end         task entry 2;
   end         task specification name;
Linking is established from another task to task 1.
   begin
      .
      .
      .
      task entry 1;
      executable statement 1;
      .
      .
      .
      task entry 2;
   end;
```

The task rendezvous instruction is executed such that when another task calls the task entry at the entry of a called task, the calling task waits until the called task reaches the accept statement corresponding to this task entry, and then the calling task waits until the end of the task entry of the accept statement.

This is the rendezvous operation. After this "end", the accessing task and the accessed task are operated by parallel processing. The instruction for causing the given task to access the task entry defined in entry and the instruction for the accept statement perform the rendezvous operation.

```
(iv) Task Selection
   select      (a currently accessible task entry is
               selected)
      accept      task entry 1 do
                  .
                  .
                  .
      end
   or
      accept      task entry 2 do
                  .
                  .
                  .
      end         task entry 2;
   end select;
```

```
                        -continued
select    (a task entry subjected to establishment
            of a conditional statement)
  when      conditional statement 1
  accept    task entry 1 do
    .
    .
    .
  end       task entry 1;
or
  when      conditional statement 2
  accept    task entry 2 do
    .
    .
    .
  end       task entry;
end select
```

The typical control structure level instructions are given as follows. Instructions (i) to (iii) are associated with the control structure.

```
(i)   loop
          exit when    conditional statement;
            .
            .
            .
          end loop
(ii)  while a conditional statement loop
            .
            .
            .
          end loop;
(iii) for I in 1 ... N loop
            .
            .
            .
          end loop;
(iv)  if condition 1 then
          executable statement 1;   (Instruction
                                     associated with
                                     selection control
                                     structure)
          else   (alternative selection instruction)
          executable statement 2;
          end if;
(v)   Case an order value is   (multimenu selection
                                 instruction)
      When first value = > executable statement 1;
      When second value = > executable statement 2;
            .
            .
            .
      When nth value = > executable statement n;
```

The typical arithmetic level instructions are as follows:

```
(i)   Arithmetic Operation Instruction
      C: = A+B;
      (operators) +, - *, /, mod, rem
(ii)  Logic Operation Instruction
      C: = A and B; ...True/False
      (operators) and, or, xor, not
(iii) Relational Operation Instruction
      A < B ...True/False
      (operators) =, /=, <, <=, >, >=
```

In the microprocessor of this embodiment, a structure with higher functions can be easily created, and the development time and cost can be decreased. In addition, the instruction decoding functions are not concentrated on one component, thereby avoiding excessive wiring. The microprocessors can be easily tested with high reliability and low cost.

The present invention is not limited to the above embodiment. Various changes and modifications may be made within the spirit and scope of the invention. In the above embodiment, the machine instruction code comprises the fields 83 and 85,/ as shown in FIG. 15. However, one machine instruction code can be constituted by a task level machine instruction code 211 of a task level operation code 207 and task level data 209, a control structure level machine instruction code 217 of a control structure level operation code 213 and control condition data 215, arithmetic level machine instruction code 223 of an arithmetic level operation code 219 and arithmetic object data 221, and a low order level operation code 229 of a low order level operation code 225 and low order level data 227, as shown in FIG. 18. The number of levels is not limited to four, but may be determined such that the system description language structure is properly matched with the hierarchical structure of the functional blocks of the microprocessor.

A further modification may be proposed such that only the control structure levels or the arithmetic levels are sequentially selected in the functional block in a given task level. In this case, since the task and control structure levels of the hierarchical instructions are identical, an instruction format of a program from which the corresponding portion is omitted can be used as an application format.

In the above embodiment, higher order functional blocks are fixed, as shown in FIG. 16. However, lower order functional blocks may be selected by a selector and the selected block may be commonly used by the higher order functional blocks. In this case, the total number of four-level functional blocks is larger than $(m+l+p+q)$ but is not larger than $(m \times l \times p \times q)$. (m denotes the number of sub blocks in the task level functional blocks 113; (, the number of sub blocks in control structure level functional block 129; p, the number of sub blocks in arithmetic level functional block 131; and q, the number of sub blocks in the low order level functional block 133.)

FIG. 19 shows one of the blocks 87 having the hierarchy as shown in FIG. 13. An operation instruction decoder 231 having an I/O interface function for the block of its own and the higher order level functional block is arranged in the input stage of the block 87. The decoder 231 is connected to the high order level functional block through buses consisting of a block code bus 233, a command bus 235, a communication bus 237 and a status bus 239. The bus 233 transmits a code for identifying a functional block. The bus 235 transmits a code for designating the functional block identified by the identification code. The bus 237 transmits input-/output data with respect to the corresponding block. The bus 239 transmits the current status of a block of its own and the accept instruction status which are signalled to the higher order level functional block. The decoder 231 decodes a code and data which are generated from the high order level functional block and transmitted through the buses 233 to 239. The decoder 231 also decodes the code and data which are stored in an operation object circuit (to be described later) and supplies the decoded code and data to the high order level functional block.

An operation object circuit 241 and an operation logic circuit 243 are arranged in the block 87. The circuit 241 comprises a memory circuit of a register, a latch, a counter or the like. The circuit 243 comprises a random logic circuit as a combination of AND, OR, NOT, NAND, NOR and exclusive-OR (EX-OR) gates. The circuit 243 receives data from the decoder 231 in response to the decoded output generated from the decoder 231 and processes the data. The processed data is written in the circuit 241. The circuits 241 and 243 perform one of the task operations, i.e., the task rendezvous, the task delay, the task selection and other task operations when the functional block belongs to the task level. However, when the functional block belongs to the control structure level, the circuits 241 and 243 perform one of the operations LOOP, CASE, WHEN, IF-THEN-ELSE-, or subprogram access and other operations. When the functional block belongs to the arithmetic level, the circuits 241 and 243 perform one of the arithmetic operations, i.e., addition, subtraction or the like. When the functional block belongs to the low order level, the operation included in the level lower than the arithmetic level is performed.

An output signal encoder 245 having an I/O interface function for interfacing with lower order level functional blocks is arranged in the output stage of each block 87. The encoder 245 is coupled to the lower order level functional blocks through buses consisting of a block code bus 247, a command bus 249, a communication bus 251 and a status bus 253. These buses correspond to the buses 233, 235, 237 and 239, respectively. The encoder 245 encodes a code and data for a lower order level functional block and sends the resultant code and data onto the buses 247 to 253. The encoder 245 also receives the code and data which are transmitted from the lower order level functional block through the buses 247 to 253.

FIG. 20 shows a microprocessor having a plurality of functional blocks each shown in FIG. 19 according to an embodiment of the present invention. Referring to FIG. 19, a functional block of the kth level (e.g., the task level) comprises the decoder 231, the circuits 241 and 243 and the encoder 245. The kth level functional block 255 is coupled to the (k−1)th level functional block (not shown) as the higher order level block through buses 257 consisting of the block code bus, the command bus, the communication bus and the status bus. The kth level functional block 255 is also coupled to i (k+1)th level functional blocks 263$_l$ through 263$_i$ through buses 259 for the lower order level and buses 261 for the higher order level of the (k+1)th level. The block 255 selectively uses the i (k+1)th level functional blocks 263$_l$ through 263$_i$ and cause the blocks 263$_l$ through 263$_i$ to execute the function of its own. The block 263$_2$ among the blocks 263$_l$ through 263$_i$ is directly coupled to t (k+2)th level (e.g., the arithmetic level) functional blocks 269$_l$ through 269$_t$ through buses 265 for the lower order level and buses 267 for the higher order level of the (k+2)th level. Another functional block 263$_i$ of the (k+1)th level is coupled to u functional blocks 271$_l$ through 271$_u$ of the (k+2)th level through buses 265 for the lower order level and buses 267 for the higher order level of the (k+2)th level. The two sets of functional blocks 269$_l$ through 269$_t$ and functional blocks 271$_l$ through 271$_u$ are used to perform the functions of the blocks 263$_2$ and 263$_i$ of the higher order level. In addition, the blocks 263$_l$ through 263$_i$ of the (k+1)th level are respectively connected to blocks 275$_1$ and 275$_2$ through buses 261 and 273. The blocks 275$_1$ and 275$_2$ are commonly used for the blocks 263$_l$ through 263$_i$ of the (k+1)th level.

When various codes and data are externally supplied to the kth level block 255 through the buses 257, the circuit 241 is operated in response to the decoded output generated from the decoder 231 under the control of the circuit 243, thereby performing predetermined processing. During this operation, the data decoded by the decoder 231 is used as needed. When a lower order level functional block is to be used during processing in the block 255, the lower order level code and data are encoded by the encoder 245. The resultant code and data are parallel-supplied to the blocks 263$_l$ through 263$_i$ through the buses 259 and 261. The operation object circuit and the operation logic circuit of a functional block which is selected among the blocks 263$_l$ through 263$_i$ by the identification code transmitted through the block code bus perform predetermined processing in response to the code transmitted through the command bus. The processed result is supplied to the kth level block 255 through the buses 259 and 261. When a still lower order level functional block is to be used during processing in the blocks 263$_2$ and 263$_i$, the corresponding encoders generate various codes and data for this still lower order level. The resultant codes and data are parallel-supplied to the blocks 269$_l$ through 269$_t$ and the blocks 271$_l$ through 271$_u$. Among these (k+2)th level blocks, a specific functional block performs predetermined processing. The processed result is supplied to the blocks 263$_2$ and 263$_i$ of the higher order level than the (k+2)th level. The blocks 275$_1$ and 275$_2$ common to the blocks 263$_l$ through 263$_i$ of the (k+1)th level are used as needed, thereby performing the operation of the (k+1)th level (proper utilization of the common blocks maximizes the effect of the hierarchical structure). In this manner, a required function can be realized by a set of functional blocks having different levels in the hierarchical structure.

In the microprocessor of this embodiment, the hierarchical structure is assigned to the operation code field, and the microprocessor itself is divided into functional blocks constituting the corresponding hierarchical structure. The instruction decoders are arranged in the input stages of the functional blocks of the respective levels, and the operations requested within the corresponding blocks are performed. For this reason, unlike the case wherein the conventional processor using a simple machine instruction code is improved for high performance, the data expression which causes a system failure of a sophisticated, high-performance system can be prevented.

In the microprocessor of this embodiment, a structure with higher functions can be easily created, and the development time and cost can be decreased. In addition, the instruction decoding functions are not concentrated on one component, thereby preventing an overly dense wiring structure. The microprocessors can be easily tested with high reliability at low cost.

Figure 21:
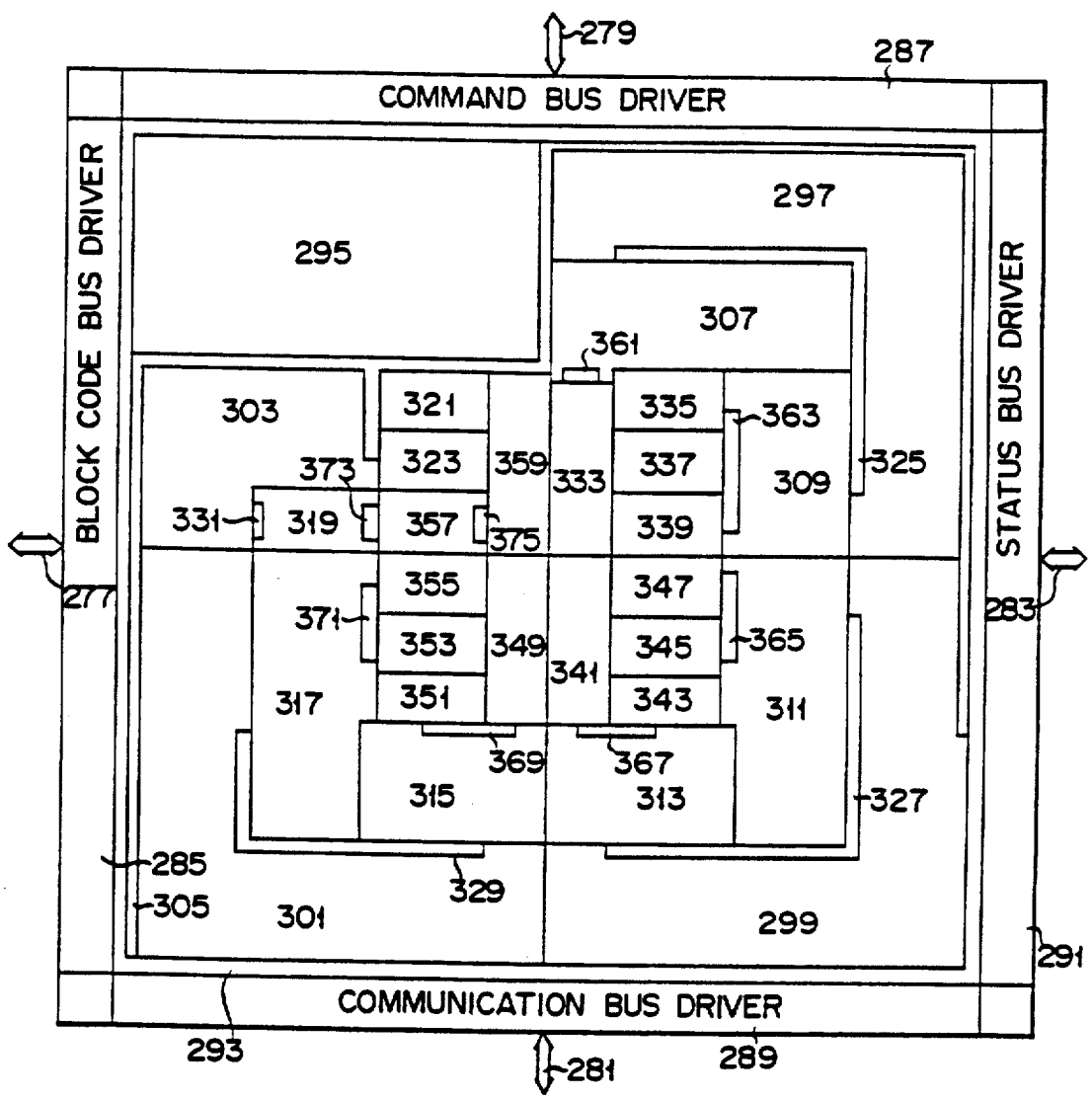
FIG. 21 is a plan view showing the chip configuration when the microprocessor of FIG. 20 is constituted by a one-chip arrangement.

FIG. 21 is a plan view showing the configuration of a chip when the microprocessor of FIG. 20 is constituted by a single-chip microprocessor. The chip is coupled to an external circuit through external buses consisting of an external block code bus 277, an external command bus 79, an external communication bus 281 and an external status bus 283. A block code bus driver 285, a command bus driver 287, a communication bus driver 289 and a status bus driver 291 which are connected to the corresponding external buses are arranged at four corners of the chip, respectively. Buses 293 consisting of the internal block command bus, the internal command bus, the internal communication bus and the internal status bus which respectively correspond to the external buses 277, 279, 281 and 283 run inside the bus drivers 85, 287, 289 and 291, respectively so as to surround the chip. Among the functional blocks described above, the highest order level block is located in the outermost portion (the peripheral portion of the chip), and the lowest order level block is located in the innermost portion (the central portion of the chip). A functional block 295 of level 1 as the highest order level is located near the drivers 285 and 287. Blocks 297 through 303 of level 2 which are used by the block 295 of level 1 are connected thereto through buses 305 consisting of the block code bus, the command bus, the communication bus and the status bus between levels 1 and 2. Functional blocks 307 and 309 of level 3 which are directly used by the block 297 are located inside the block 297. Similarly, functional blocks 311 and 313 of level 3 directly used by the block 299, and functional blocks 315 and 317 directly used by the block 301 are respectively located inside the blocks 299 and 301. In addition, a functional block 319 of level 3 which is directly used by the block 303 is located inside the block 303. Functional blocks 321 and 323 commonly used by the blocks 297 through 303 of level 2 are located inside the block 295. The block 297 of level 2 is coupled to the blocks 307 and 309 of level 3 through buses 325 arranged therebetween. The block 299 of level 2 is coupled to the blocks 311 and 313 of level 3 through buses 327 arranged therebetween. Similarly, the block 301 of level 2 is coupled to the blocks 315 and 317 of level 3 through buses 329 arranged therebetween, and the block 303 of level 2 is coupled to the block 319 of level 3 through buses 331 arranged therebetween. Blocks 333, 335, 337 and 339 of level 4 are located inside the blocks 307 and 309 of level 3. Among these blocks, the block 333 is adjacent to the block 307, the block 335 is adjacent to the blocks 307 and 309 of level 3, and the blocks 337 and 339 are adjacent to the block 309 of level 3. At the same time, the block 333 is located at the center of the chip. Four blocks 341, 343, 345 and 347 of level 4 are located inside the blocks 311 and 313 of level 3. Among these four blocks, the block 341 is adjacent to the block 313 of level 3, the block 343 is adjacent to the blocks 311 and 313 of level 3, and the blocks 345 and 347 are adjacent to the block 311 of level 3. At the same time, the block 341 is located at the center of the chip. Four blocks 349, 351, 353 and 355 of level 4 are located inside the blocks 315 and 317 of level 3. Among these four blocks, the block 349 is adjacent to the block 315 of level 3, the block 351 is adjacent to the blocks 315 and 317 of level 3, and the blocks 353 and 355 are adjacent to the block 317 of level 3. At the same time, the block 349 is located at the center of the chip. A functional block 357 of level 4 is located inside the block 319 of the level 3, and a functional block 359 of level 5 is located inside the block 357. The block 359 is located at the center of the chip. The block 307 of level 3 is coupled to the block 333 of level 4 through buses 361 arranged therebetween. The block 309 of level 3 is coupled to the blocks 335, 337 and 339 of level 4 through buses 363 arranged therebetween. The block 311 of level 3 is coupled to the blocks 345 and 347 of level 4 through buses 365 arranged therebetween. The block 313 of level 3 is connected to the blocks 341 and 343 of level 4 through buses 367 arranged therebetween. The block 315 of level 3 is coupled to the blocks 349 and 351 of level 4 through buses 369 arranged therebetween. The block 317 of level 3 is coupled to the blocks 353 and 355 of level 4 through buses 371 arranged therebetween.

The block 319 of level 3 is coupled to the block 357 of level 4 through buses 373 arranged therebetween, and the block 357 of level 4 is coupled to the block 359 of level 5 through buses 375 arranged therebetween. Each group of the block code bus, the command bus, the communication bus and the status bus extends along the four sides of the chip. The functional blocks of the levels with the predetermined hierarchical structure are systematically arranged together with the corresponding buses. With this arrangement, the bus area can be minimized, and the chip size can be decreased, thereby achieving high-speed operation.

Figure 22:
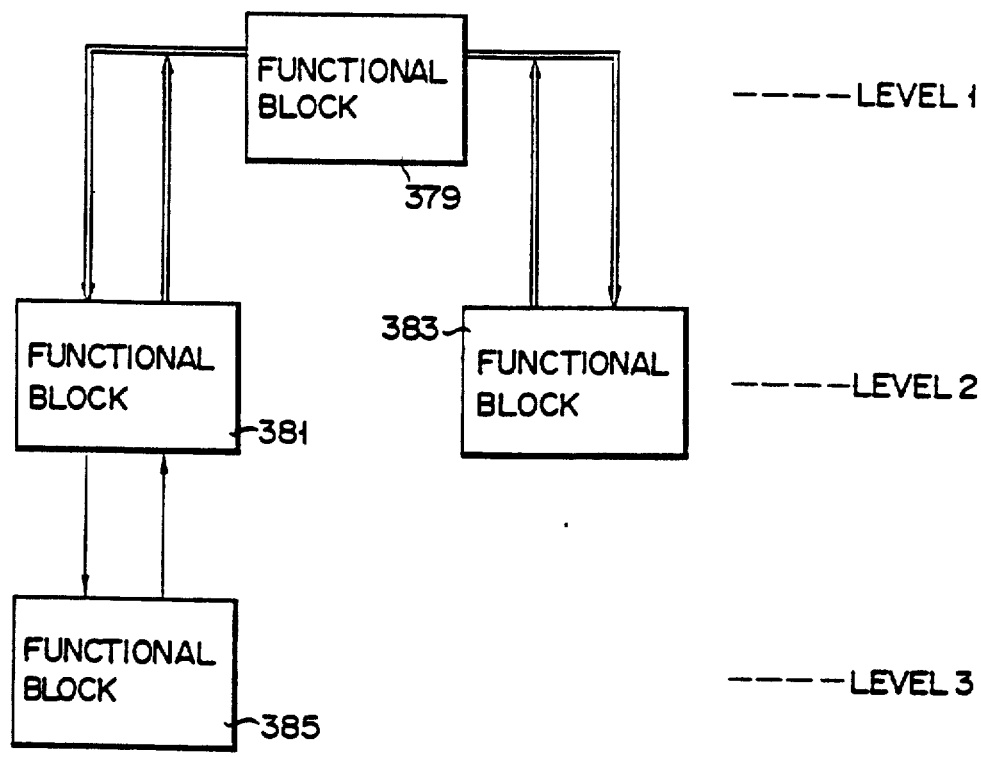
FIG. 22 is a block diagram showing a controlled status of the microprocessor so as to explain the principle of the present invention.

FIG. 22 shows the basic concept of the processing control apparatus with the hierarchical structure. A block 379 of level 1 (i.e., the highest order level) has a dynamic memory circuit for storing data only while clock signals are supplied from a special clock source (not shown) thereto, and a dynamic timing control circuit for generating various timing signals only in response to the clock signals. Blocks 381 and 383 of level 2 respectively have dynamic memory circuits and timing control circuits and are operated under the control of the block 379 of level 1. A block 385 of level 3 has a dynamic memory circuit and a timing control circuit and is operated under the control of the block 381 of level 2. The block 379 of level 1 corresponds to the task level when the processing functions are hierarchically classified into the task level, the control structure level, the arithmetic level and the low order level lower than the arithmetic level. The blocks 381 and 383 of level 2 correspond to the control structure level, and the block 385 of level 3 corresponds to the arithmetic level.

The blocks 379 to 385 have single operation functions, respectively. Each of the blocks 379 to 385 performs the same operation during the operating period in response to the operation instruction from the higher order level. The operating time range and the processing function range of a given order level functional block are narrower than those of a higher order level functional block. A control gate circuit is arranged in each block to control and supply data and various signals such as clock signals to other functional blocks. The control gate circuit is enabled only when the corresponding functional block uses a lower order level functional block.

When the block 379 performs a given operation, the block 379 accesses the block 381 or 383 of a lower order level by its own judgement. The block 379 uses the function of the block 381 or 383. In this case, the data and various signals including the clock signal are exchanged between the block 379 and the block 381 or 383 through the control gate circuit during only the execution period of the block 381 or 383. Only required temporary status data is stored in the memory circuit in the block 381 or 383. Similarly, when the block 381 performs a given operation, it accesses the block 385 of a lower order level by its own judgement, thereby utilizing the function of the block 385. Data and various signals including the clock signal and data exchanged between the blocks 381 and 385 are limited to those generated during the operation of the block 385. When the functional blocks perform predetermined operations, the corresponding timing control circuits are operated to generate various timing signals, thereby controlling the sequence using these signals.

In this manner, when a block of a given order level uses a block of a lower order level, the operation of the blocks of the low order level remains the same, and the operating time is substantially predetermined. Therefore, the function and the timing of the block of the lower order level can be predicted. As a result, the operating times of these functional blocks, and the relationship with other circuit blocks for receiving resources such as the data processed during the operations of these blocks, the control signals, the status signals, the clock signals and the like can be accurately determined. The improvement of the operating speed and the yield can be effectively achieved in the system design level.

When a high-performance VLSI microprocessor is to be developed, an interference with another block will not occur even if the micro operation sequence and the data structures are modified. For this reason, the design and test of products can be easily performed, thereby shortening the development period and decreasing the total cost.

When the functional block of a given level uses a function assigned to a functional block of a low order level, various signals including the clock signal are supplied to the block of the given order level while the block of the lower order level is being operated. Otherwise, the block of the lower order level is not operated. No power is consumed during the off time. Therefore, a microprocessor has low power consumption.

The memory circuit and the timing control circuit of each functional block comprise a dynamic circuit arrangement. Therefore, as compared with the static circuit arrangement, the number of elements can be decreased, and the chip size can be decreased.

Figure 23:
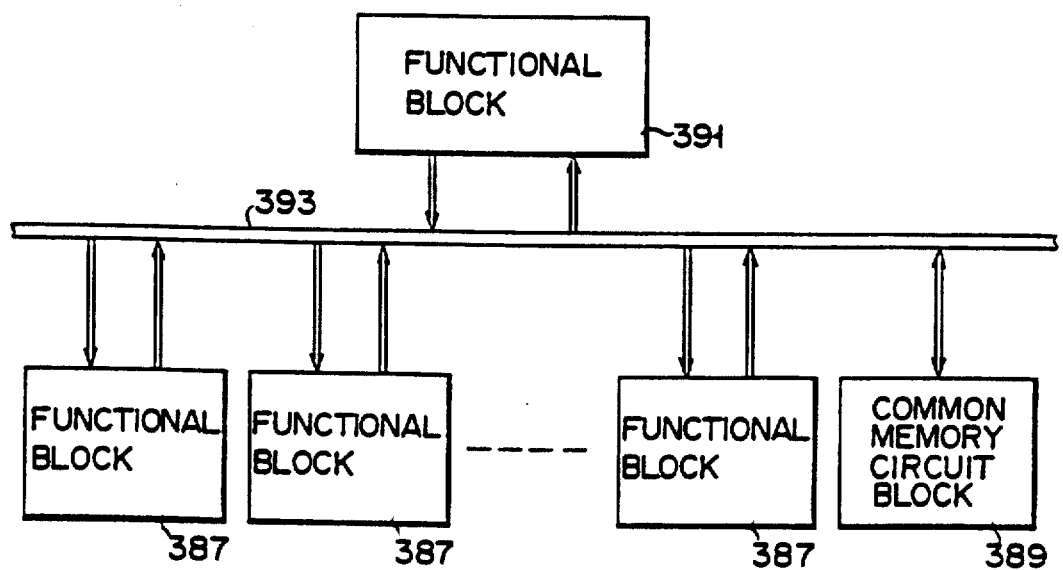
FIG. 23 is a block diagram showing another controlled status of the microprocessor so as to explain the principle of the present invention.

FIG. 23 shows another basic concept of the processing apparatus with the hierarchical structure. The independent memory circuits are arranged in the functional blocks in FIG. 22, respectively. In the case shown in FIG. 23, one memory circuit block 389 is provided for a plurality of functional blocks 387 of an identical level. The block 389 is commonly used by the plurality of blocks 387. The blocks 387 and the block 389 are coupled to a block 391 of the high order level through a bus 393.

The memory circuit in each functional block comprises a flip-flop, a latch, a register or the like. When the memory circuit is locally located in the functional blocks of the identical level, the overall circuit arrangement is increased in size. In order to prevent this, the common memory circuit block 389 is provided to some or all of the memory circuits in the functional blocks, thereby providing a compact circuit arrangement.

Figure 24:
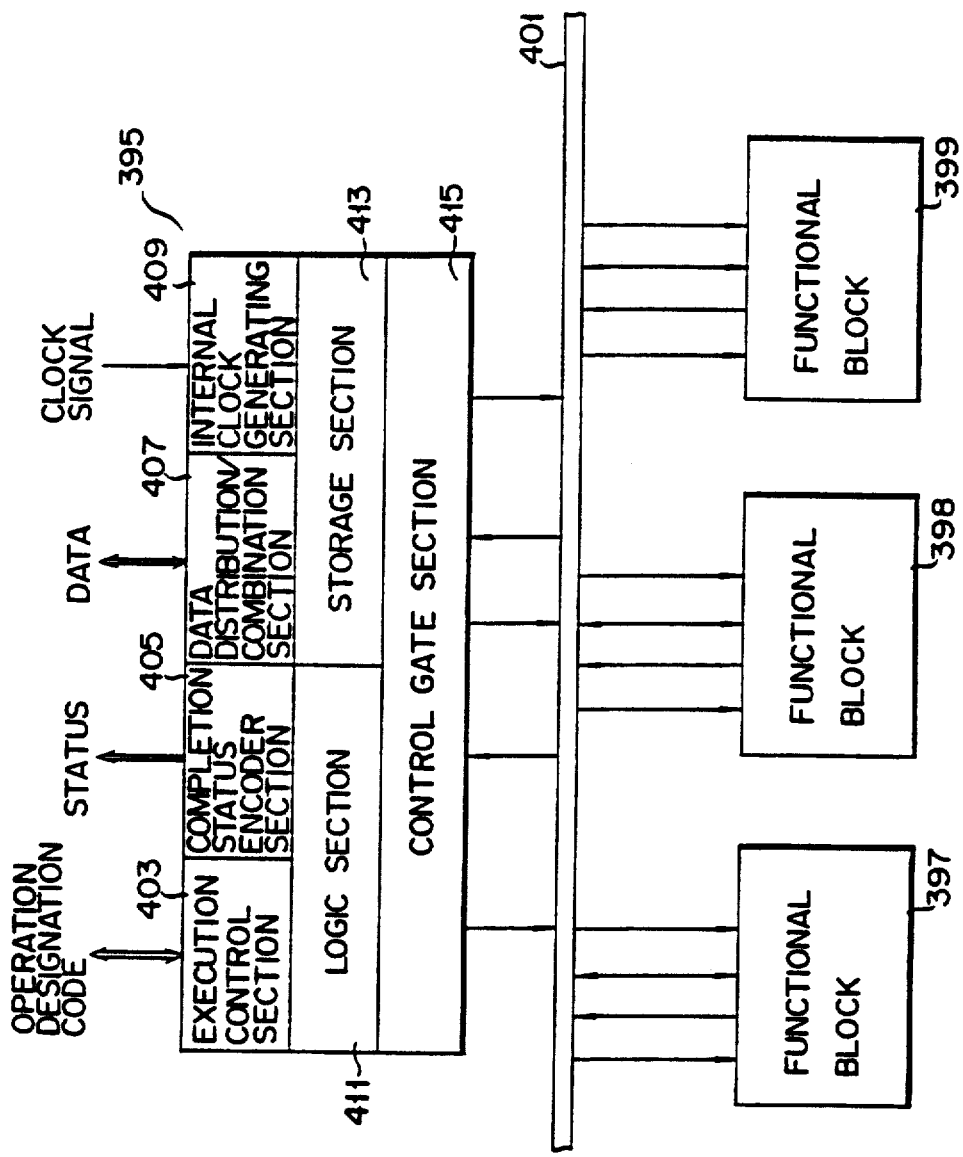
FIG. 24 is a block diagram showing a microprocessor according to another embodiment of the present invention.

FIG. 24 is a block diagram of a circuit based on the concept of FIG. 23. A bus 401 connects a functional block 395 of a given order level and functional blocks 397 to 399 of a lower order level. As exemplified by the block 395, each functional block comprises an execution control section 403, a completion status encoding section 405, a data distribution/combination section 407, an internal clock generation section 409, a logic section 411, a storage section 413 and a control gate section 415.

The section 403 comprises a programmable logic array (PLA) prestoring a microprogram. The section 403 selects one of the microsequences in response to the operation designation code which is supplied from the upstream of the block 395. The section 403 sequentially generates various timing signals in accordance with the selected sequence. The section 403 has a dynamic circuit arrangement and is operated only when the clock signal is supplied from the section 409.

The section 405 generates a status signal when the predetermined operation in the corresponding functional block is completed. The status signal is supplied to other functional blocks.

The section 407 distributes various types of data supplied from other functional blocks. When the operation in the block of its own is completed, the section 407 combines the data as the result to be supplied to other blocks.

The section 409 generates all clock signals required in the corresponding functional block in accordance with the clock signals supplied from an external component or other functional blocks.

The section 411 comprises a combination of gate circuits such as AND, OR, NOT, NAND, NOR and exclusive OR gates. The section 411 performs processing in accordance with the microsequence selected by the section 403.

The section 413 comprises a register, a latch, a counter, or the like. The section 413 stores initial data required for execution of the operation in the section 411. The section 413 also stores intermediate data and the processed results. The section 413 has the dynamic circuit arrangement described above and is operated only in response to the clock signal supplied from the section 409.

The section 415 controls exchange of data, the operation designation code, the operation completion status data, the clock signal and the like between the functional block of its own and another functional block when the other functional block is to be used for the block of its own.

With the above arrangement, the operation designation code is supplied to the block 395 of the given order level; and an operation start time, an operation end time, and an effective time interval therebetween are given as ts0, te0 and T0, respectively. The operation designation codes are supplied to the blocks 397, 398 and 399 of the lower order level; and operation start times and operation end times are given as ts1, ts2 and ts3, te1, te2 and te3, respectively. Under these assumptions, effective execution time intervals T1, T2 and T3 are given as follows:

$$T1 = te1 - ts1 ... \quad (1)$$

$$T2 = te2 - ts2 ... \quad (2)$$

$$T3 = te3 - ts3 ... \quad (3)$$

The following relations are established for the times ts1, ts2 and ts3 of the blocks 397, 398 and 399 and the times te1, te2 and te3 thereof:

$$ts1 < ts2 < ts3 ... \quad (4)$$

$$te1 < te2 < te3 ... \quad (5)$$

Relations (4) and (5) indicate that the blocks 397, 398 and 399 are simultaneously started or in an order of the blocks 397, 398 and 399, and that the blocks 397, 398 and 399 are simultaneously ended or in an order of the blocks 397, 398 and 399. When relations (4) and (5) are satisfied in the apparatus, the time ts0 leads the time ts1 and the time te0 is lagged from the time te3.

A minimum value of the execution time interval T0 in the block 395 of the given order level is an execution time interval $(T1) + \alpha$ required for parallel-operating the blocks 397, 398 and 399 or only the block 397. A maximum value of the execution time interval T0 is an execution time interval $(T1+T2+T3)+\beta$ required when the blocks 397, 398 and 399 are sequentially operated.

The above relationships indicate that the functional blocks of the lower order level can be parallel-operated, that the respective functional blocks independently determine their own power consumption time intervals, and that the signal is supplied to the blocks during the determined time intervals.

Figure 25:
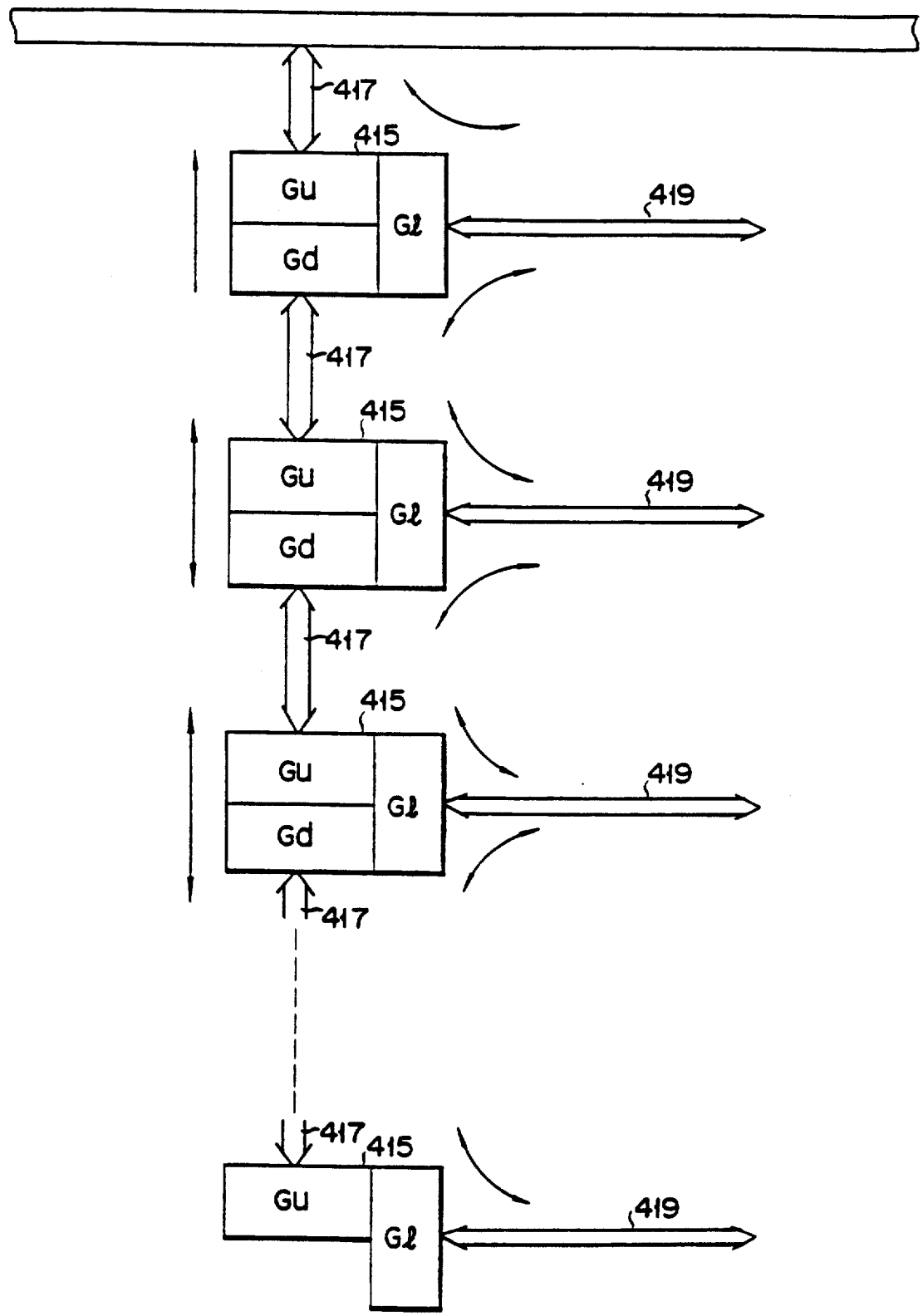
FIG. 25 is a block diagram showing the detailed arrangement of control gates provided in the functional block.

FIG. 25 is a block diagram showing the detailed arrangement of the control gate 415 arranged in each block. As shown in FIG. 25, each gate 415 comprises three portions. The three portions comprise a higher order gate Gu for exchanging the data and the various signals with the higher order level block, a lower order gate Gd for exchanging the data and the various signals with lower order level blocks, and a local gate Gl for gating the data and various signals between the blocks of the identical level. The control gates 415 are connected to each other through buses 417 for connecting higher and lower order level blocks. The gates in the blocks of the identical level are connected to other gates 415 through the corresponding local buses 417.

The operation designation code, the data and the clock signal are supplied from the block of a given order level to the block of a lower order level. The completion status data and the return data are supplied from the block of the lower order level to the block of the given order level. The gates Gu, Gd and Gl of each gate 415 comprise bidirectional or unidirectional gate circuits, respectively.

Figure 26:
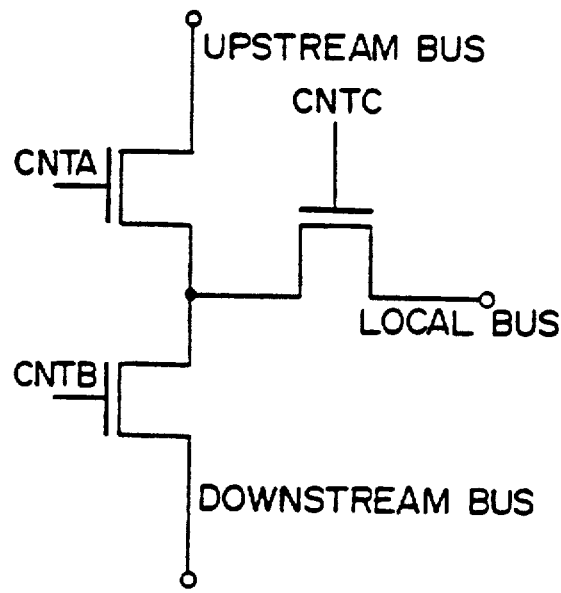
FIGS. 26 through 28 are respectively circuit diagrams showing an example of a bus switching control bus.
Figure 27:
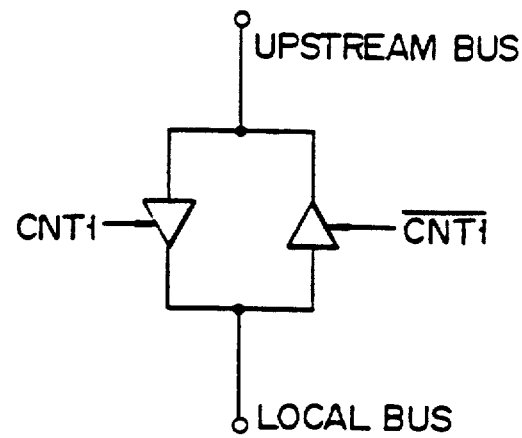
Figure 28:
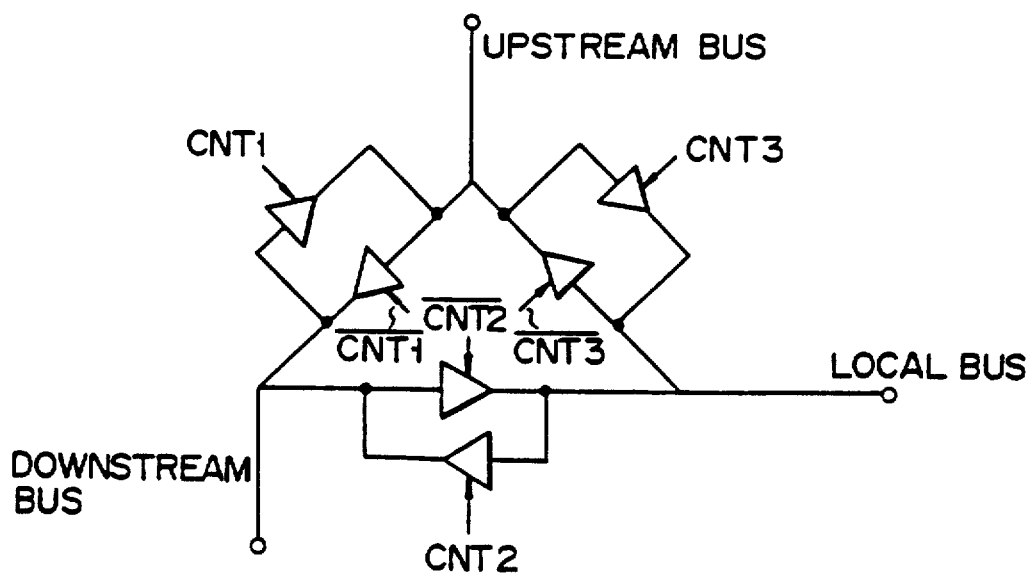

The gate circuits are illustrated in FIGS. 26 through 28. FIGS. 26 and 28 show a logic for switching the bus in three directions; and FIG. 27 shows a logic for switching the bus in two directions.

Figure 29:
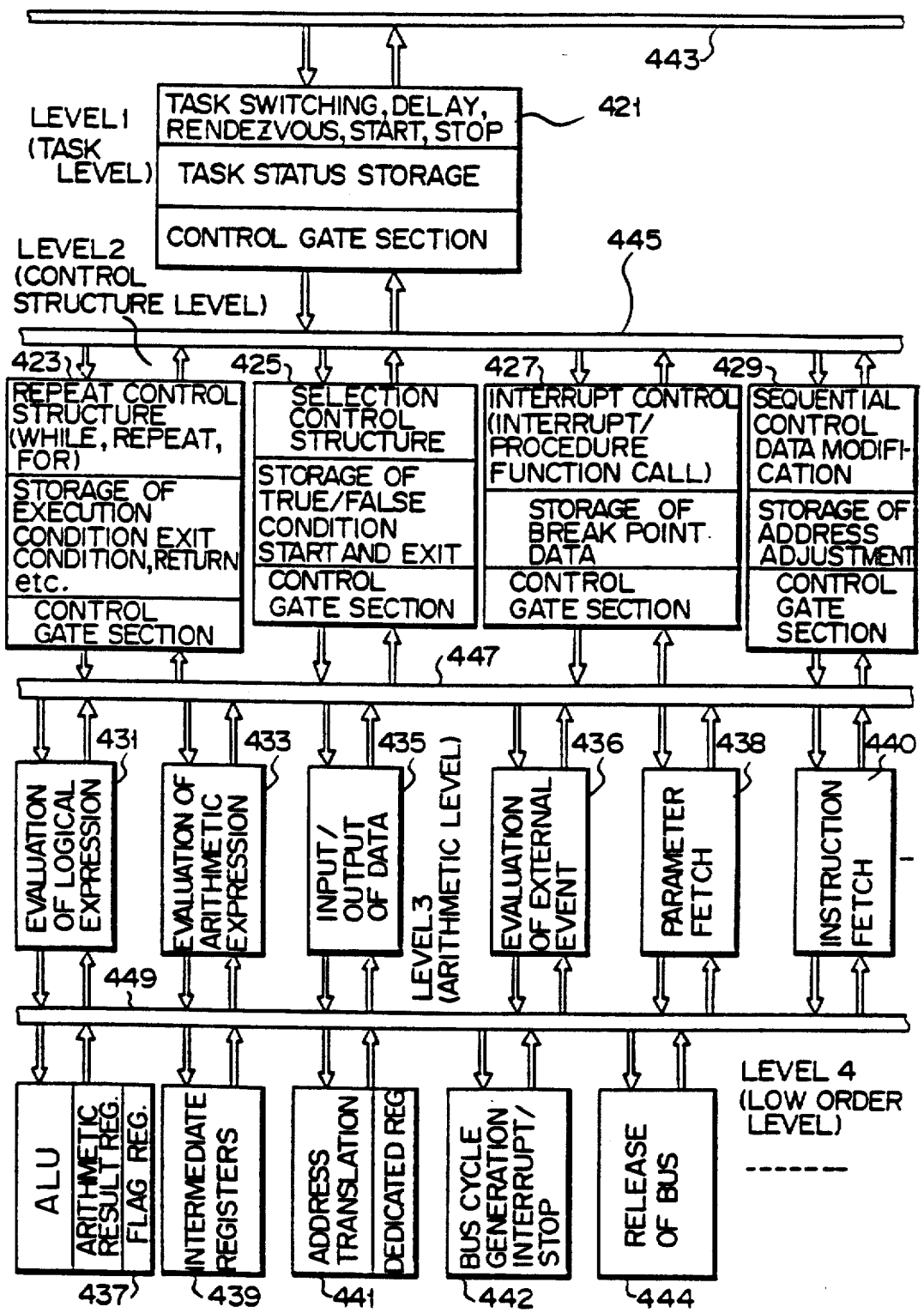
FIG. 29 is a detailed block diagram of the microprocessor according to the present invention.

FIG. 29 shows the detailed configuration of the microprocessor which adapts the principle of the present invention. This processor can be compatible with a system description language such as Ada or parallel-operated (concurrent) Pascal.

A functional block 421 of level 1 as the highest order level performs task level operations such as task switching, a task delay, a task rendezvous, task starting, task ending, task priority processing, task number processing, task wait queue processing, or task execution/preparation/wait/delay time processing. The block 421 then selects one of program control structure level blocks of level 2.

In functional blocks 423, 425, 427 and 429 of the program control structure level as level 2, the control structure level operations such as operation of a repeat control structure (e.g., WHILE, REPEAT and FOR), operation of a select control structure (e.g, IF and CASE), operation of interrupt control (e.g., interrupt, procedure, and function call), and operation of sequential control (e.g., data modification) are performed. During the operation, the block of level 2 selects one of the arithmetic level blocks of level 3.

In functional blocks 431, 433, 435,... of the arithmetic level as level 3, arithmetic level operations such as an evaluation of logical expression, an evaluation of arithmetic expression, an input/output of data, an evaluation of an external event, parameter fetch and instruction fetch are performed. During this operation, the block selects one of the blocks of level 4.

Functional blocks 437, 439 and 441 of level 4 perform ALU processing, intermediate register processing, address translation, bus cycle generation/interrupt/stop processing, and processing of release of the bus.

The functional blocks from level 1 to level 4 are connected through buses 443, 445, 447 and 449. In the functional block of each level, object data is read out from the corresponding memory circuit as needed, and the readout data is processed in the ALU (the functional block 437) of level 4.

The main feature of this microprocessor lies in the fact that the functions and timings are selectively determined by the access method using the control gates.

In the microprocessor of the present invention, the functions assigned to the functional blocks of an order level lower than a given order level are clearly separated when the functional block of the given order level performs its own function. At the same time, the operating time of the block of the given order level falls within the minimum time interval for which the functional block of the lower order level performs its own function. When each block is repeatedly accessed, the identical operation is repeated. The functional block of the lower order level is operated independently but parallel to the operation of the block of the given order level as needed. Therefore, the system time margin of the operating speed of each functional block can be predicted. The overall operating speed is increased, and the margin for variations in manufacture of VLSI microprocessors is increased and an increased yield can be obtained.

Furthermore, all the functional blocks can hold data for their own minimum operating time interval and can be timing-matched. With this arrangement, the CMOS circuit arrangement, especially, the dynamic memory circuit arrangement can be utilized to decrease the number of elements, thereby decreasing the chip size. Furthermore, since only the functional block of a lower order level which is accessed by the functional block of a given order level is operated, and other blocks are kept off, power consumption can be decreased. As a result, the power consumption of the entire chip during the operation can be greatly decreased.

An addition instruction is executed in the microprocessor having the arrangement of FIG. 29, as compared with that in the conventional microprocessor.

The addition instruction execution by the conventional microprocessor will first be described. When addition is expressed in the form of source code, conventional decoding is shown as follows:

| L  R1, A | load A in register |
|----------|---------------------|
| A  R1, B | add B to data in register |
| ST R1, C | store sum in memory |

The above expressions are explained as follows. The content at address A of the memory is loaded in a register R1. The content of the register R1 is added to the content at address B of the memory. A sum is stored at address C of the memory. In other words, three steps are required for an addition. In this case, an instruction format is illustrated in FIGS. 30A through 30L.

According to the processing apparatus of the present invention, conventional coding can be replaced with the following expression:

$$C:=A+B;$$

In other words, only one step is required for an addition. When the source code is translated into an object code, the object code comprises a bit string designating arithmetic operation level, an operation code for addition, an address of parameter A, an address of parameter B, and an address of parameter C.

Figure 1:
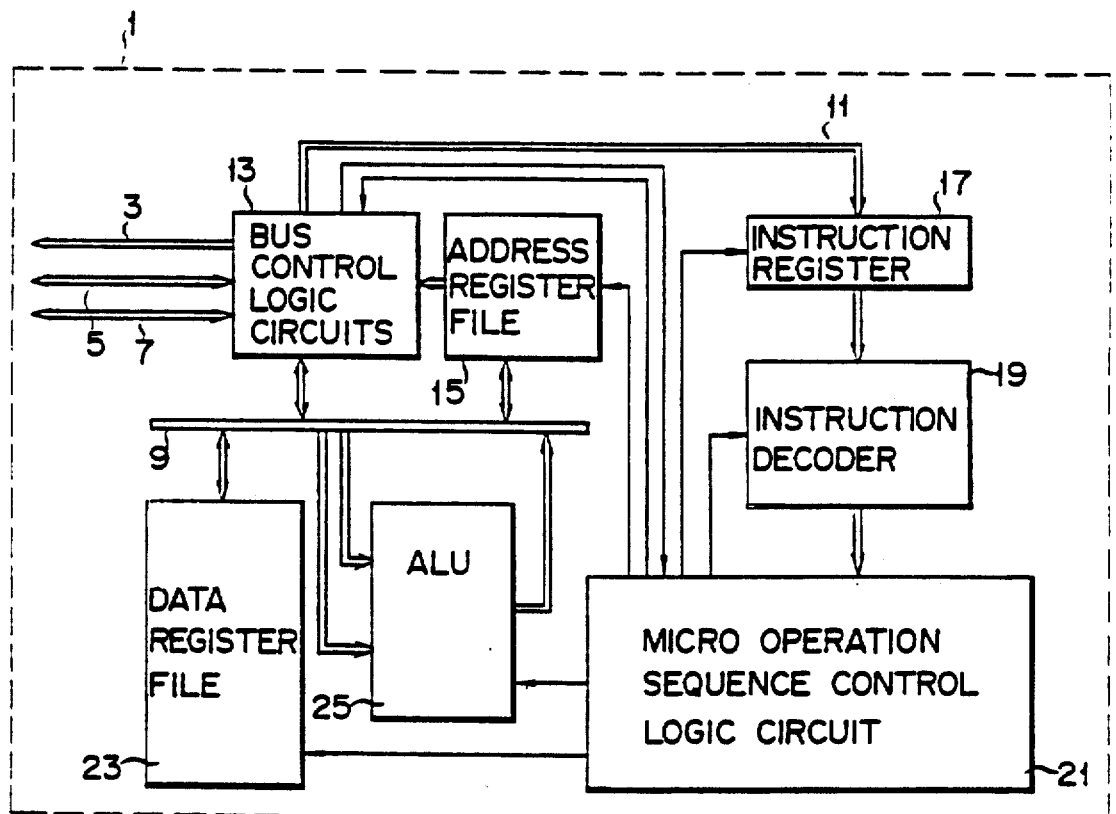
FIG. 1 is a block diagram showing a conventional microprocessor.
Figure 2:
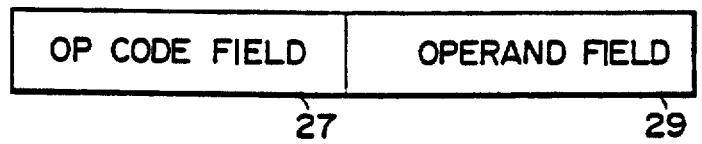
FIG. 2 is a format of a machine instruction used in the conventional microprocessor.
Figure 3:
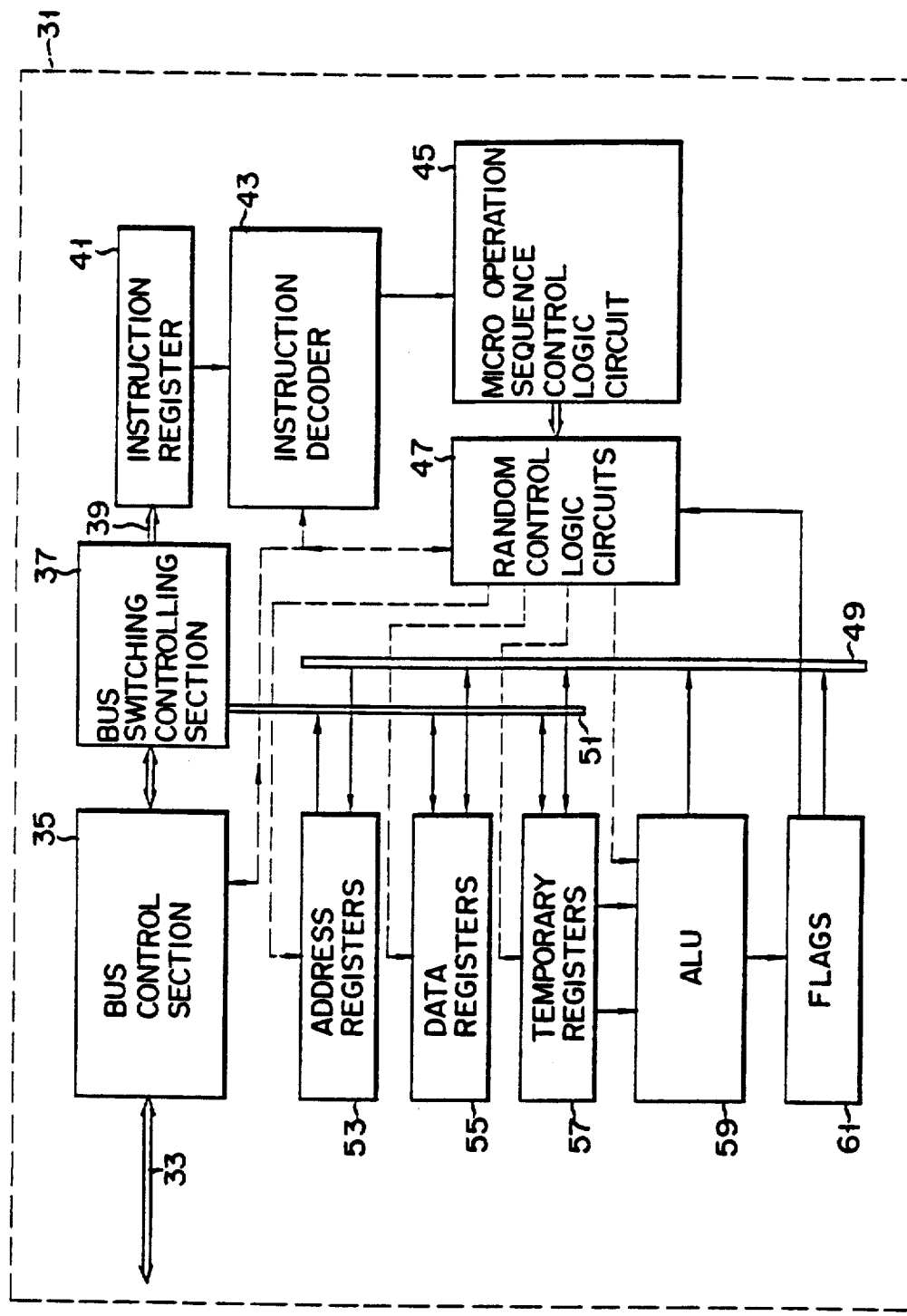
FIG. 3 is a block diagram showing another conventional microprocessor.
Figure 4:
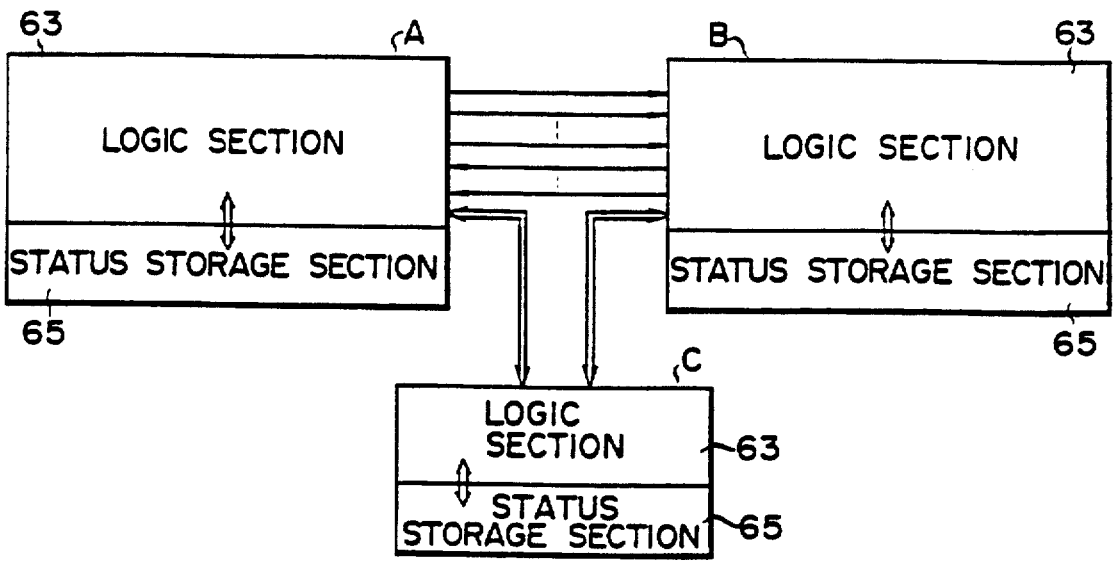
FIGS. 4 and 5 are functional blocks for explaining the controlled status in conventional microprocessors, respectively.
Figure 5:
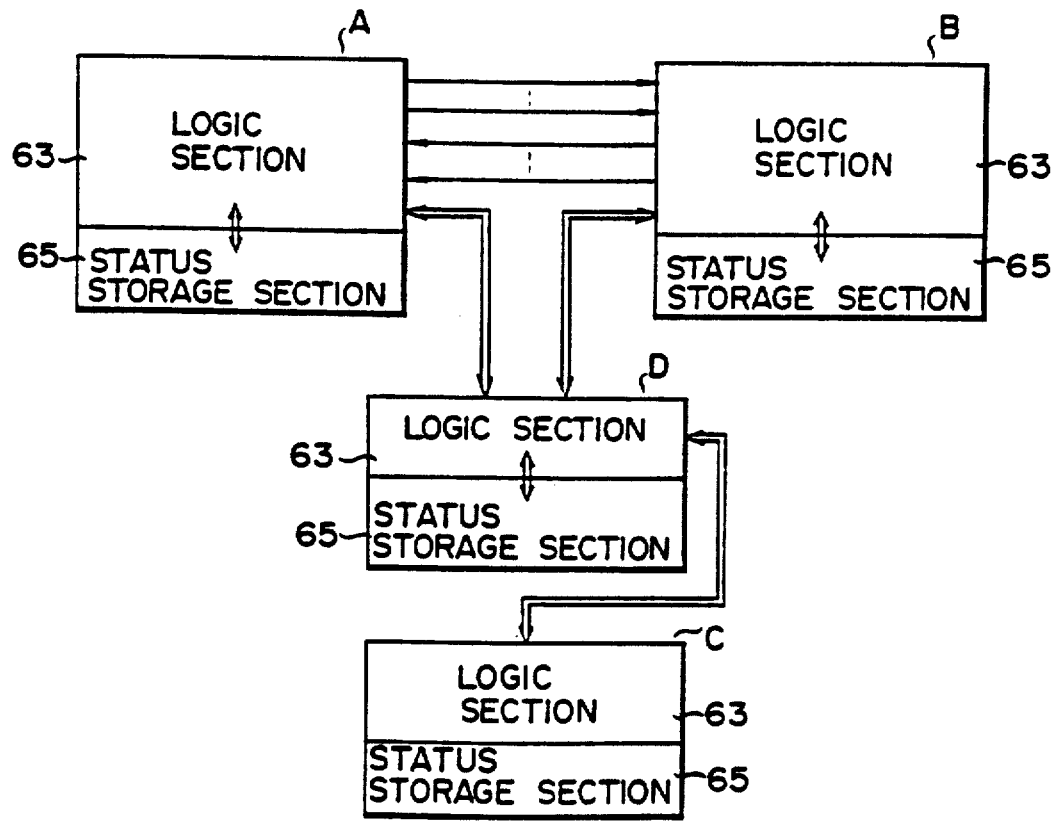
Figure 6:
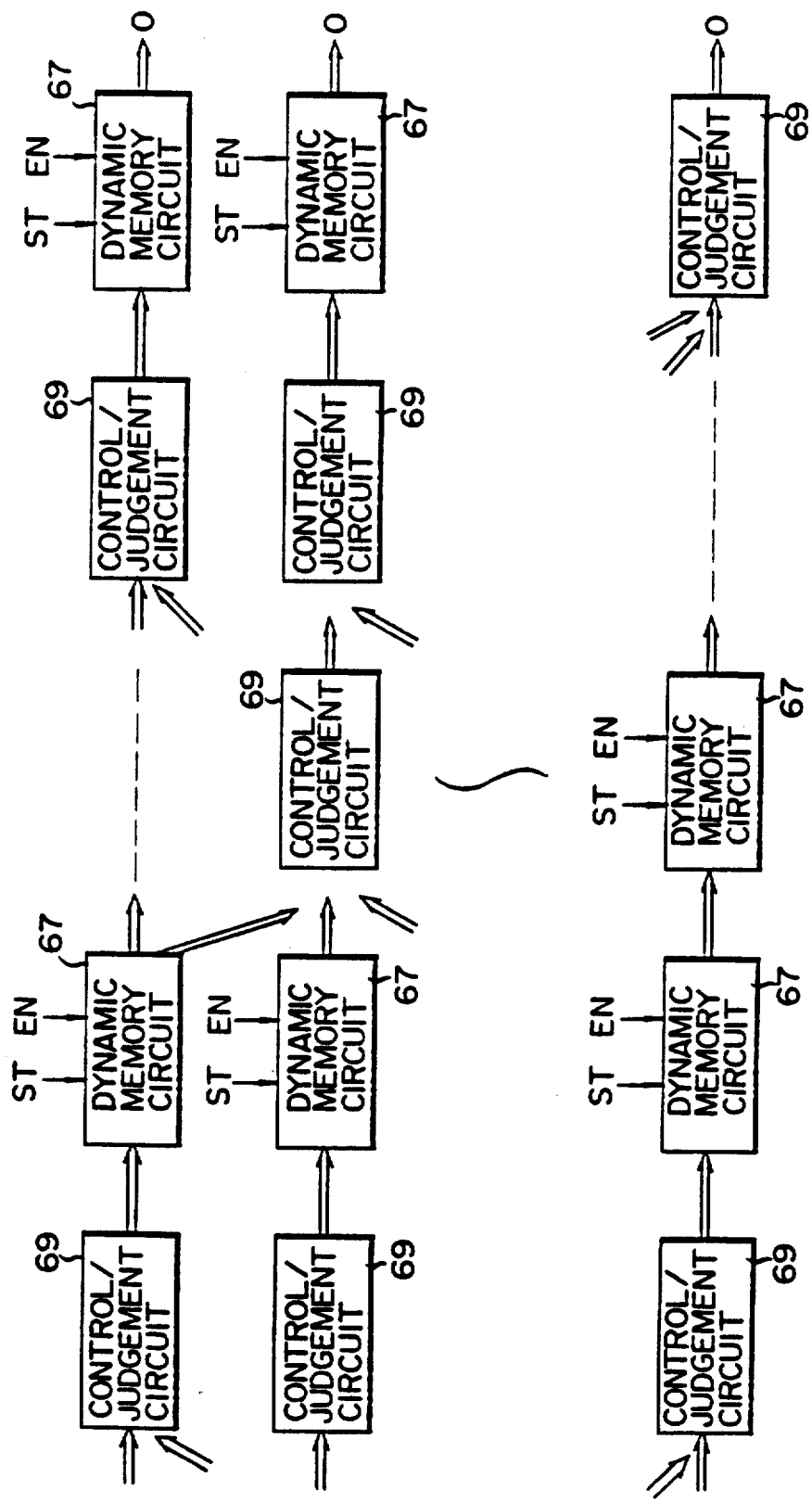
FIG. 6 is a block diagram of a conventional all dynamic microprocessor.
Figure 7:
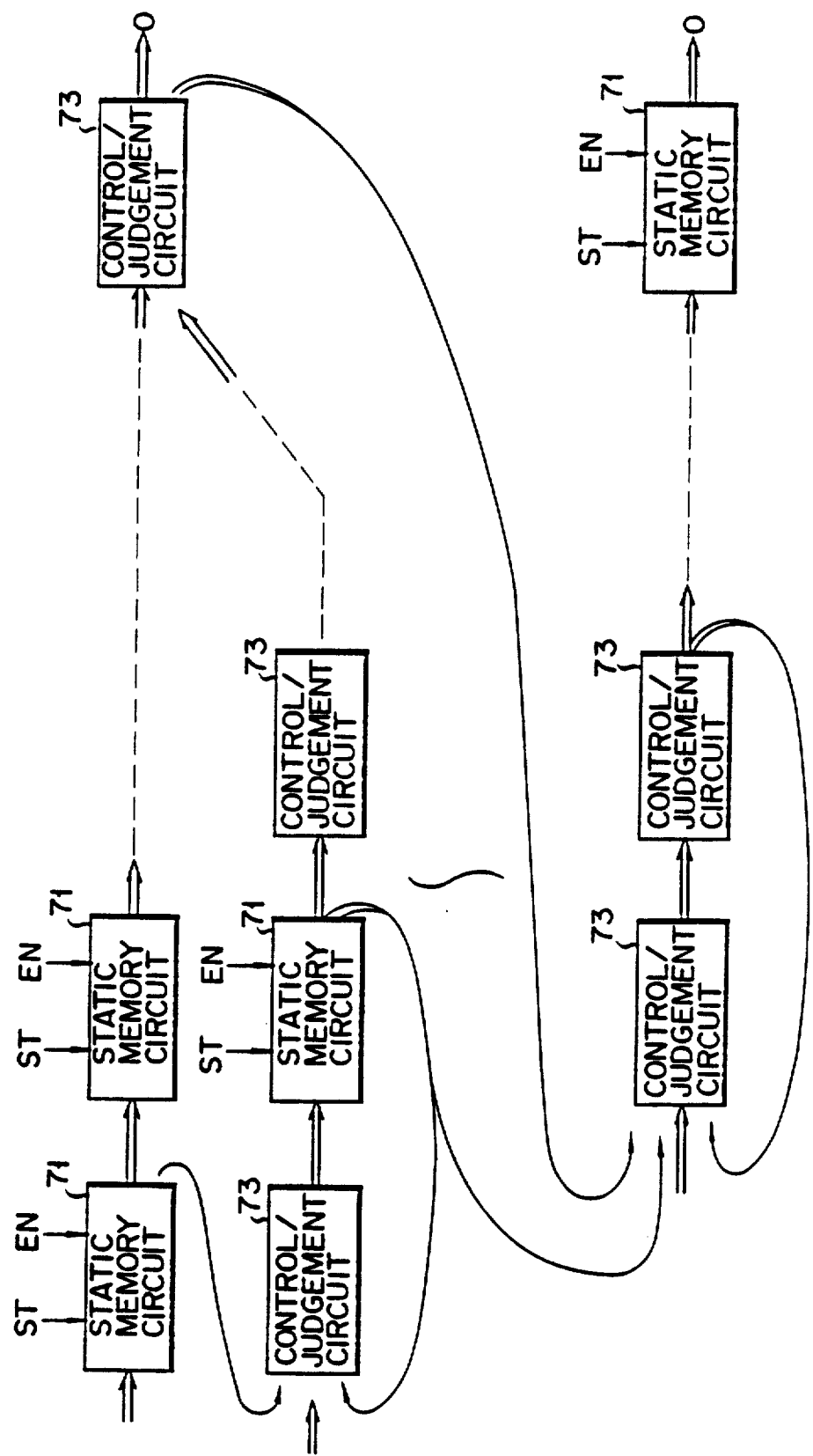
FIG. 7 is a block diagram of a conventional all static microprocessor.
Figure 8:
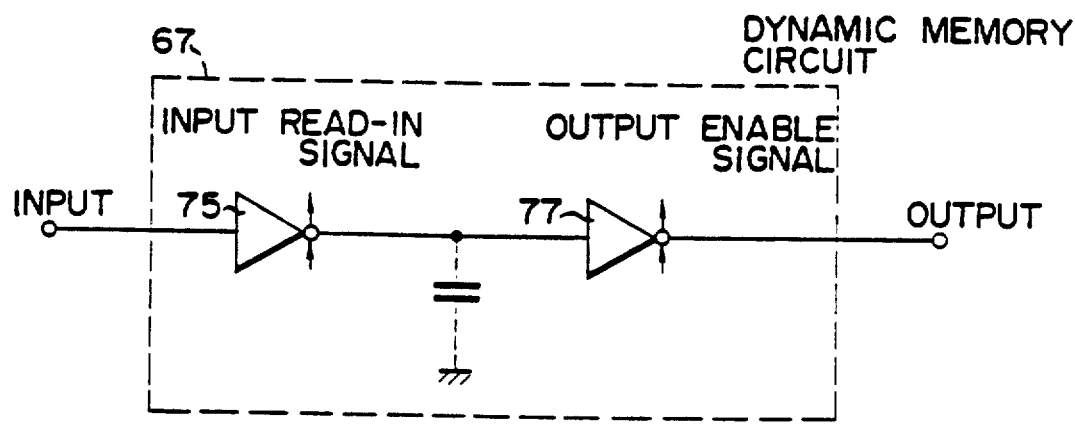
FIG. 8 is a circuit diagram of the conventional dynamic memory circuit.
Figure 9:
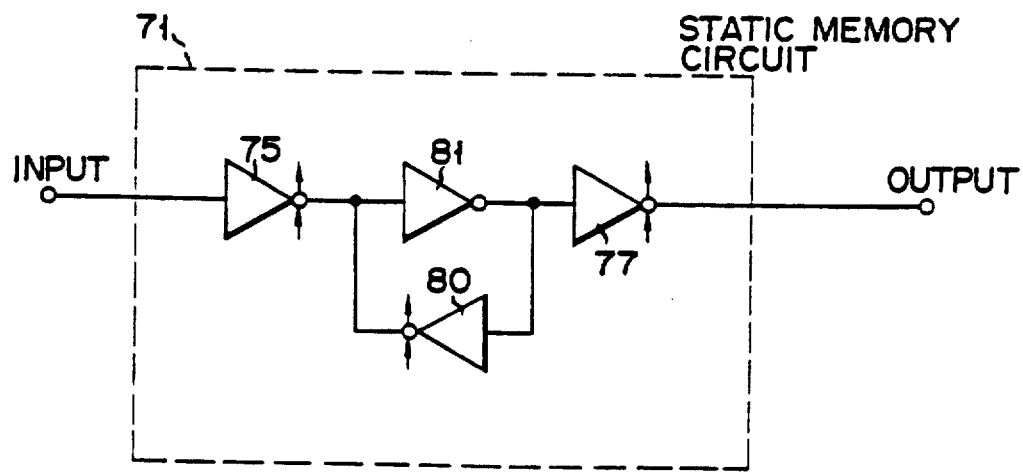
FIG. 9 is a circuit diagram of the conventional static memory circuit.
Figure 10:
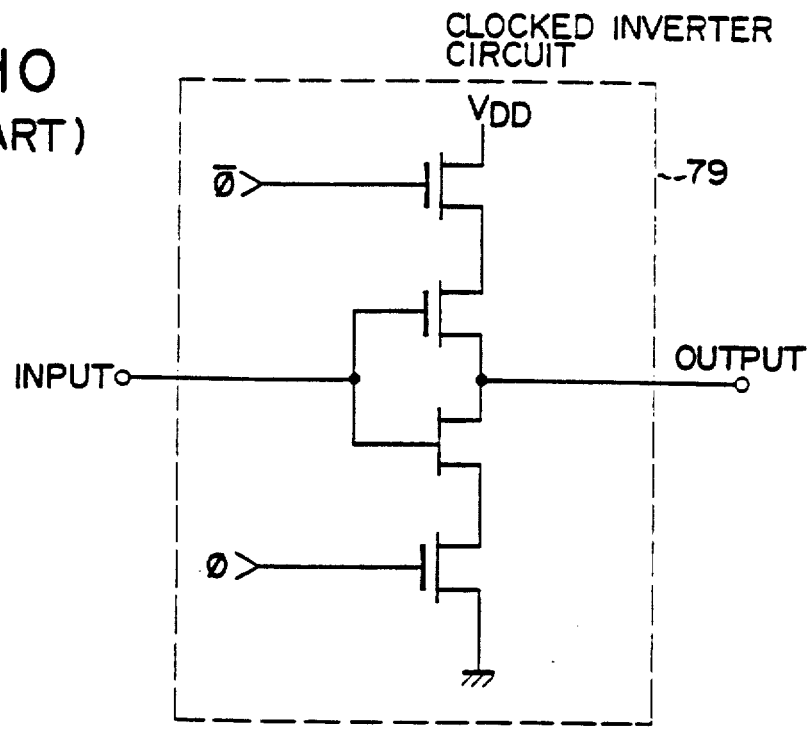
FIG. 10 is a circuit diagram of a clocked inverter used in FIGS. 8 and 9.

The control of hardware (FIG. 29) in addition instruction execution will be described as compared with the conventional hardware (FIG. 3). The conventional hardware control will first be described with reference to FIGS. 3 and 32.

In step 451 of FIG. 32, the registers 53 send a program counter value (PC value) onto the bus 51. In step 453, the controller 35 starts a bus cycle for an instruction fetch. In step 455, the controller 35 generates the address and receives the instruction from the memory. In step 457, the controller 37 loads the load instruction in the register 41. In step 459, the decoder 43 decodes the instruction. In step 461, the decoder 43 starts the micro operation sequence of the load instruction. In step 463, address A is set in the registers 53. In step 467, the controller 35 starts the bus cycle for memory read access. In step 469, the data is loaded in the register R1 (the data registers 55). The above steps are required for loading the content at address A of the memory in the register R1.

Figure 33B:
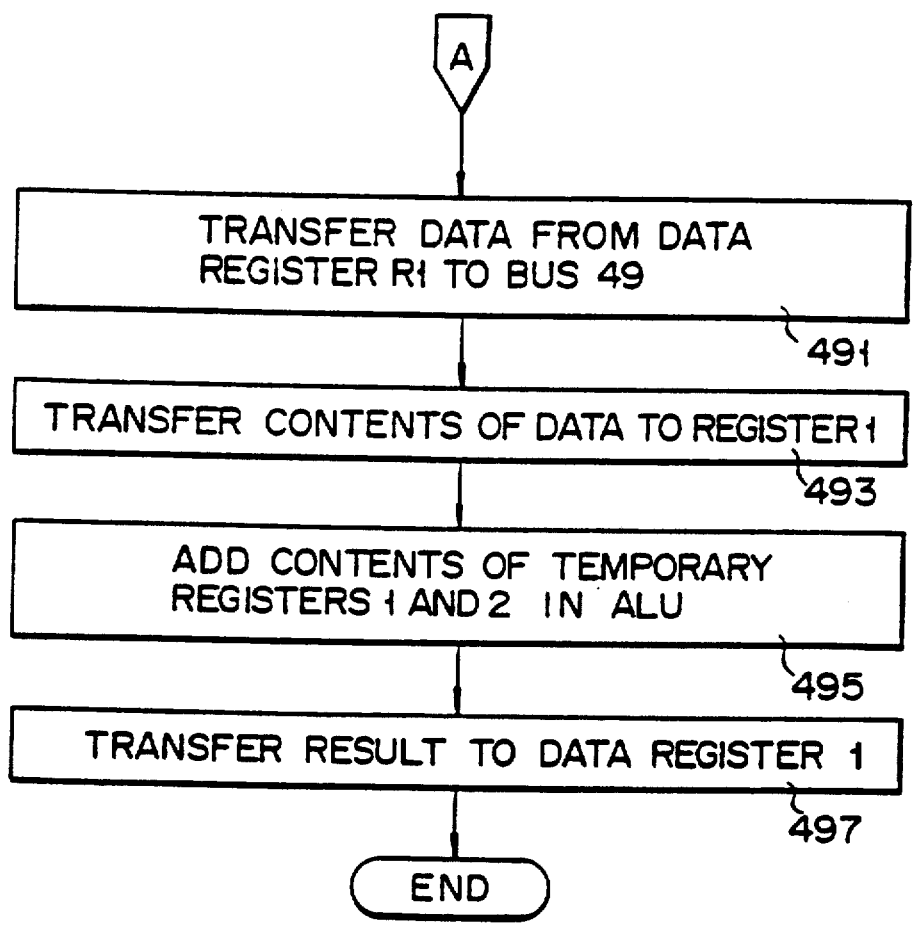

Control for adding the content of the register R1 and the content at address B of the memory will be described with reference to FIGS. 3, 33A and 33B. In step 471, the registers 53 send the updated PC value onto the bus 51. In step 473, the controller 35 starts the bus cycle for instruction fetch.

In step 475, the controller 35 generates the address and receives the instruction from the memory. In step 477, the controller 37 loads an addition instruction in the register 41. In step 479, the decoder 43 decodes the instruction. In step 481, the section 45 and the circuits 47 start the micro operation sequence of the A instruction. In step 483, address B is set in the registers 53. In step 485, the controller 35 starts the bus cycle for memory read access. In step 487, the controller 35 generates address B and receives the data from the memory. In step 489, the data is loaded in the second register (the temporary registers 57). In step 491, the data is sent from the register R1 (the data registers 55) onto the bus 49. In step 493, the content at address A of the memory is transferred to the first temporary register (the temporary registers 57). In step 495, the contents of the first and second temporary registers 57 are added by the ALU 59. In step 497, the sum is transferred to the register R1 (55).

Control for adding the content of the register R1 (55) and the content at address C of the memory will be described with reference to FIGS. 3 and 34. In step 499, the registers 53 send an updated PC value onto the bus 51. In step 501, the controller 35 starts the bus cycle. In step 503, the controller 35 generates the address and receives the instruction from the memory. In step 505, the controller 37 loads the ST instruction in the instruction register. In step 507, the instruction decoder decodes the ST instruction. In step 509, the section 45 and the circuits 47 start the micro operation sequence of the ST instruction. In step 511, address C is set in the address register. In step 513, the controller 35 starts the bus cycle for memory write access. In step 515, the content of the register R1 is sent onto the bus 51. In step 517, address C is generated, and the resultant data is written in the memory.

Hardware control of this embodiment will be described with reference to FIGS. 29 and 35 when operation C:=A+B; is performed. In step 519, an instruction is fetched from the memory such that the control gate of the control structure level designates a block from which the instruction is fetched, and that the block causes the block 441 and the block 442 of the lower order level to operate, thereby fetching the instruction from the corresponding memory. In step 521, since it is determined that the fetched instruction does not belong to that of the task level, the data passes from the bus 443 to the bus 445. In step 523, the data passes from the bus 445 to the bus 447 while the sequential control structure of the control structure level controls the blocks (431, 433, 435, 436, 438 and 440) of the arithmetic level.

In step 525, the evaluation of the arithmetic expression is selected. In step 527, the block 433 causes the block 441 to operate so as to calculate memory read addresses A and B. At the same time, in step 529, the block 433 causes the block 441 to operate so as to calculate memory address C. Steps 527 and 529 are operated parallel to each other. In step 533, the block 435 starts the block 442 to generate the bus cycle. In step 531, the block 433 receives data A from the memory through the block 421, the bus 445, the block 429 and the bus 447. Steps 531 and 533 are operated parallel to each other. In step 539, the block 435 starts the block 442 to generate the bus cycle. In step 537, the data input/output block causes the memory to read out data B in the same manner as described above. In step 535, addition is prepared. The block 433 supplies to the block 437 the data A and B received from the block 435. The block 437 performs an addition in step 541. In step 543, the block 433 starts the block 442 to generate the bus cycle. In step 545, the sum is stored in the memory.

FIGS. 36A through 36E show processing time when an addition instruction is executed by a conventional microprocessor. FIGS. 37A through 37E show processing time when an addition instruction is executed by the processing apparatus of the present invention. As is apparent from FIGS. 37A through 37E, when the addition instruction is executed by the processing apparatus, the processing time can be greatly decreased as compared with the conventional case shown in FIGS. 36A through 36E.

The repeat control structure instruction will be described when it is processed by the conventional microprocessor and the processing apparatus of the present invention.

The repeat control structure instruction is expressed by source codes as follows:

```
        L    R1, 1     Load the initial value in register.
LOOP    C    R1, 10    Compare R1 with 10.
        BP   EXIT      End loop if R1 > 10

. execution instructions

AI   R1, 1     R1 + 1 → R1
        B    Loop      Return to the beginning of loop.
EXIT         start instruction outside the loop
```

The source code expression can be rewritten by the object codes as follows.

The instruction fetch, decoding and execution is performed at the beginning:

| L | R1 | INITIAL VALUE |

The instruction fetch, decoding and execution are repeated by the number of times of looping:

| C | R1 | FINAL VALUE |

| BP | EXIT ADDRESS |

| AI | R1 | 1 |

| B | LOOP ADDRESS |

A plurality of microprogram operating times are required for each instruction.

According to the processing apparatus of the present invention, the repeat control structure instruction can be expressed by the source codes as follows:

```
for I in 1...10 loop
  .
  . execution statements
  .
end loop;
```

The above source codes can be expressed by the object codes as follows:

| CONTROL STRUCTURE LEVEL BIT STRING | LOOP INSTRUC- TION OPERATION CODE | ADDRESS OF PARA- METER 1 | INITIAL VALUE | FINAL VALUE | LOOP TERMINATION ADDRESS |

In this instruction code format, the loop return address need not be included in the instruction since the next address can be calculated during the instruction fetch. In addition, the instruction fetch and decoding need be performed only once.

Figure 38:
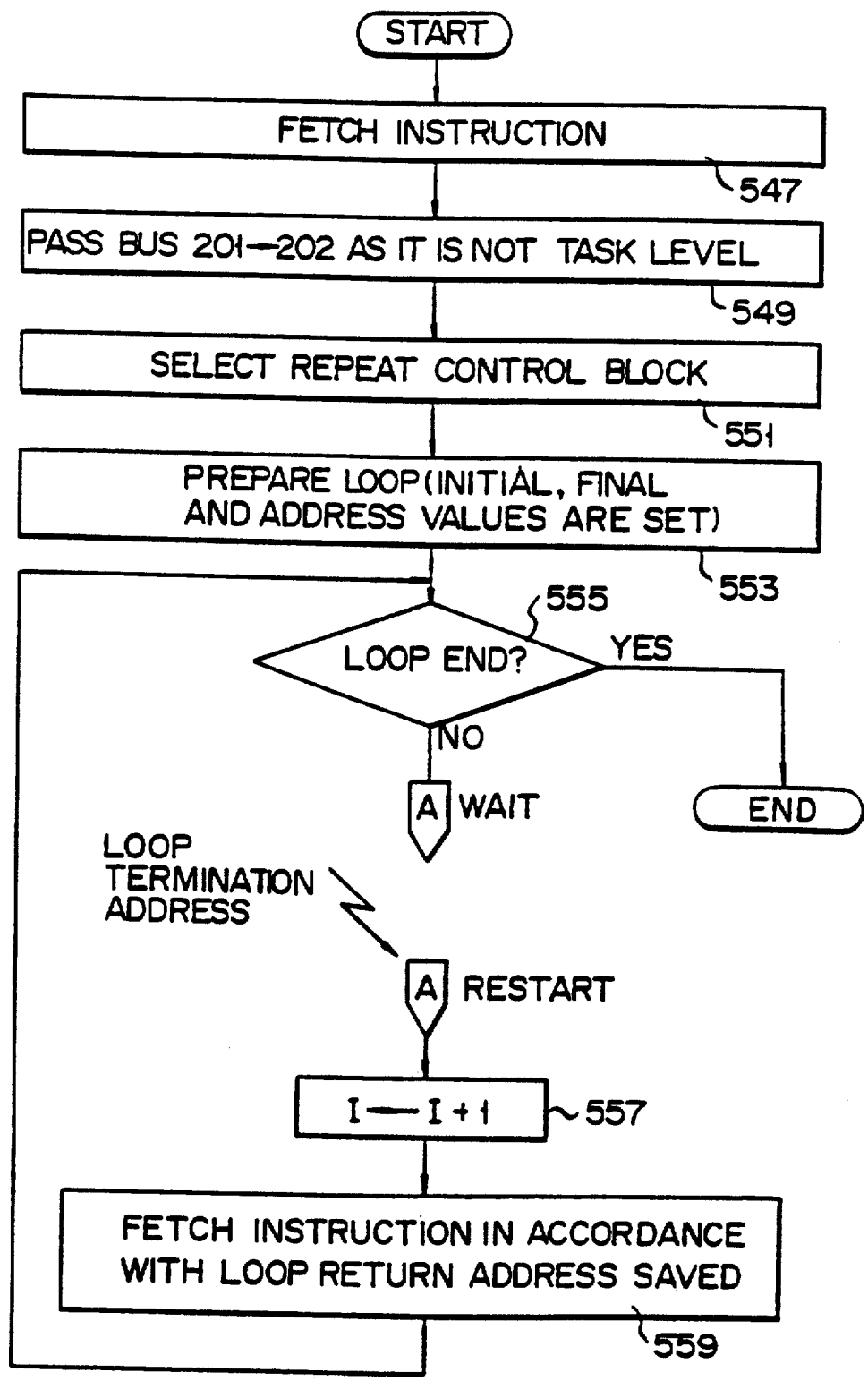
FIG. 38 is a flow chart for explaining the operation when an instruction of a repeat control structure is executed by the processing apparatus according to the present invention.

The execution of the repeat control structure instruction by the processing apparatus of the present invention will be described with reference to the flow chart of FIG. 38 and the block diagram of FIG. 29. In step 547 of FIG. 38, the block 440 of FIG. 29 causes the blocks 441 and 442 to fetch the instruction. In step 549, since the repeat control structure instruction is not a task level instruction, it passes through the buses 443 and 445. In step 551, the block 423 is selected. The loop is prepared in step 553. The initial, final and address values are set in a register of the block 423. These data are set in the judgement register by the circuit 163 in the block 129 of FIG. 16. When a multiple loop is formed, the initial, final and address values are saved in a stack or memory (not shown). In step 555, the circuit 161 checks by using the comparator in the block 423 whether or not the loop is ended. If NO in step 555, a wait flip-flop in the block 423 is set. During this operation, the instructions in the loop are executed, and each instruction is checked by the comparator in the block 423 every time one instruction is ended. When the address is updated and reaches a loop termination address, the loop number is incremented by one in step 557. In step 559, the block 423 supplies the loop return address to the fetch block 440 so as to fetch the next instruction, and the flow starts with step 555 again.

The execution of the task rendezvous instruction by the processing apparatus of the present invention will be described with reference to FIGS. 19, 26, 39A and 39B. In this case, the source program is described in the following manner.

(1) Task Side To Be Called
 1 Task Declarative Part
   entry    task entry name (formal parameter list)
 2 Task Body
   accept   task entry name (formal parameter list)
   .
   .
   .
   end      task entry name
(2) Calling Side
   .
   .
   .

task entry name (actual parameter list)

The above source codes are translated into the object codes as follows:

(1) Task Side To Be Called

| BIT STRING DESIG- NATING TASK LEVEL | ACCEPT INSTRUC- TION OPERATION CODE | TASK NUMBER | TASK ENTRY ADDRESS | FORMAL PARA- METER 1 | ... | FORMAL PARA- METER n | BIT STRING DESIG- NATING TASK LEVEL | COMPLETE OF ACCEPT OPERATION CODE | TASK NUMBER |

(2) Calling Side

| BIT STRING DESIGNATING TASK LEVEL | TASK CALL OPERATION CODE | TASK NUMBER | TASK ENTRY ADDRESS | REAL PARAMETER 1 | ... | REAL PARAMETER n |

Figure 39B:
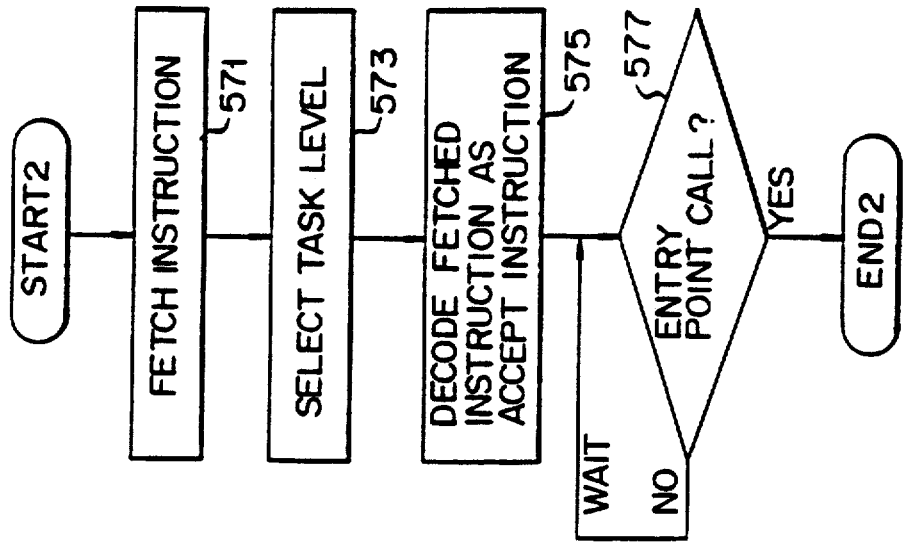
FIGS. 39A and 39B are respectively flow charts for explaining the operation when a task rendezvous instruction is executed by the processing apparatus of the present invention.
Figure 39A:
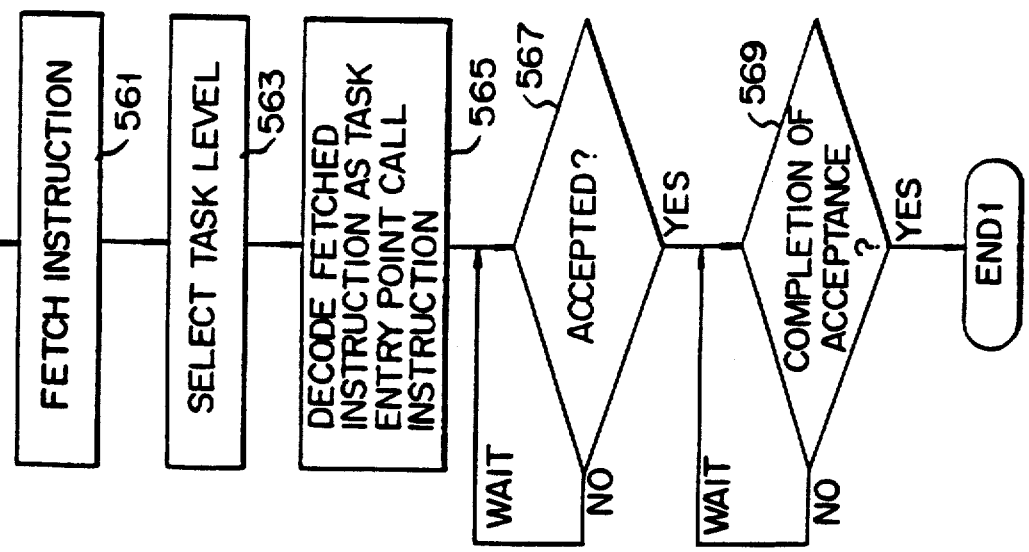

The operation of the task rendezvous instruction will be described with reference to the flow charts of FIGS. 39A and 39B. FIGS. 39A and 39B show the operation flows of the calling side and the called side, respectively. In step 561, the instruction fetch block 440 (FIG. 29) is started and causes the address translation block 441 and the bus cycle generation/interrupt/stop block 442 to fetch the instruction. The same operation as in step 561 is performed in step 571 in the flow of the called side. In step 563, the task level is selected. The task level is also selected in the called side in step 593. In the calling side, the instruction fetched by the block 421 is decoded to translate it as a task entry point call instruction. The task number, the addresses and the parameters are set in the register of the block 421. Similarly, in the called side, the block 421 decodes the fetched instruction and translates it as an accept instruction in step 575. The task number, the addresses and the parameters are set in the register in the block 421. In step 577 of FIG. 39B, the called side is held in the wait status until the entry point call is made from the calling side. The calling side is held in the wait status until the called side detects the accept instruction. This is performed by the judgement flip-flop and the judgement logic (not shown) in the circuit 121 of the block 113 (FIG. 16). If YES in both step 569 in the calling side and step 577 in the called side, these tasks are synchronized.

Figure 40:
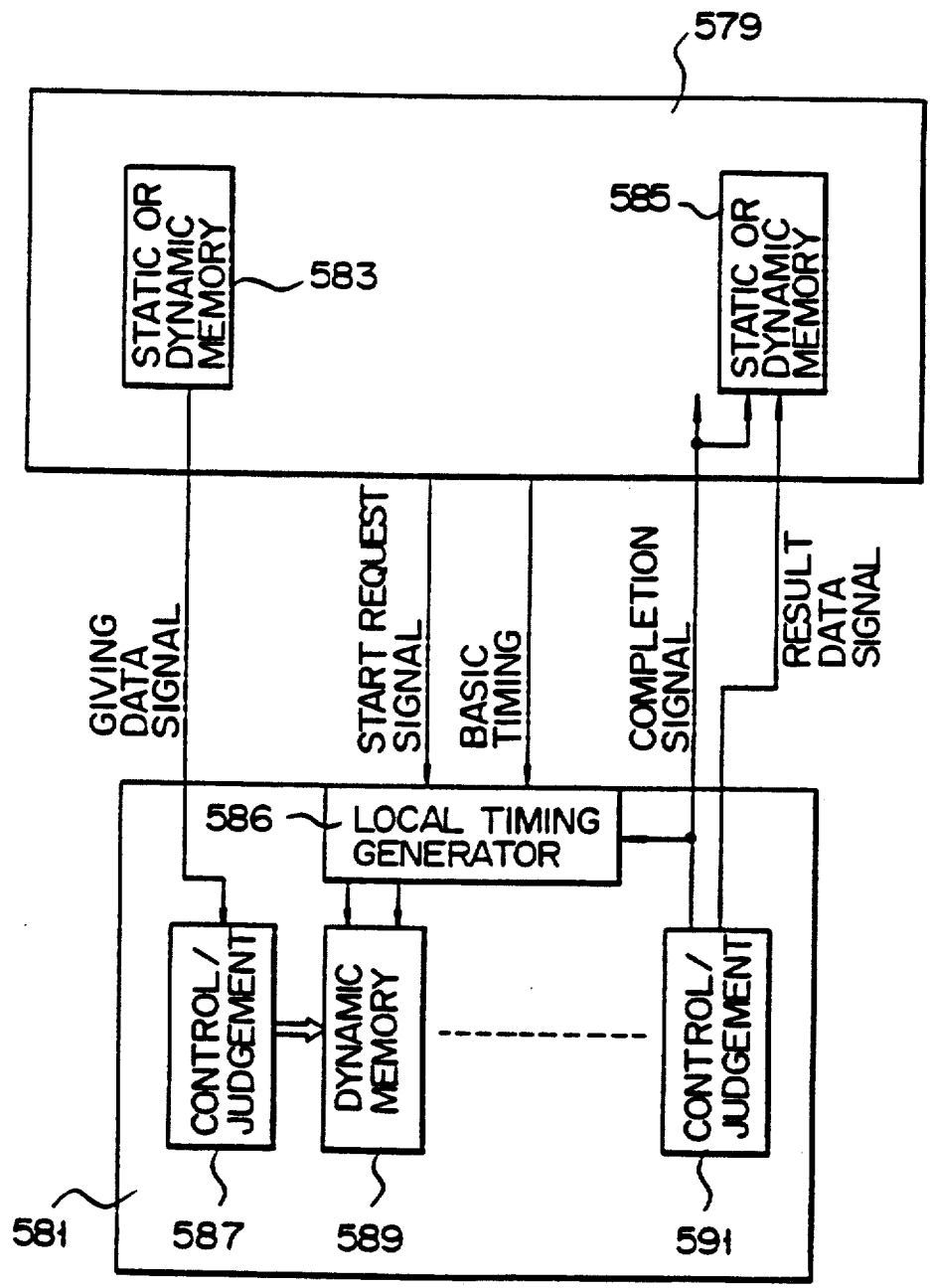
FIG. 40 is a block diagram showing only parts associated with the memory section in the embodiment of the present invention.

FIG. 40 shows only a part associated with the memory section 413 (FIG. 24) of the microprocessor. In a block 579 of a given order level, a static (required in the highest order level to supply the data and various signals to a block 581 of the lower order level) or dynamic (data and various signals can be held for over the operating time of the block) memory 583 is arranged. A static or dynamic memory 585 is also arranged in the block 579 to store the return data or the like from the block 581 of the low order level when the operation is completed.

A timing signal generator 586, a control/judgement circuit 587 for performing control/judgement in accordance with the data stored in the memory 583, a dynamic memory 589 for storing data generated from the circuit 587, and a control/judgement circuit 591 for generating a signal requesting the end of oscillation of an internal oscillating circuit in the generator 586 upon completing the operation of the block 581 are arranged in the block 581 of the low order level. The block 579 of the given order level supplies a start request signal and a basic timing signal to the block 581 of the lower order level as needed. Each block includes these circuits and is arranged as shown in FIG. 24.

Figure 41:
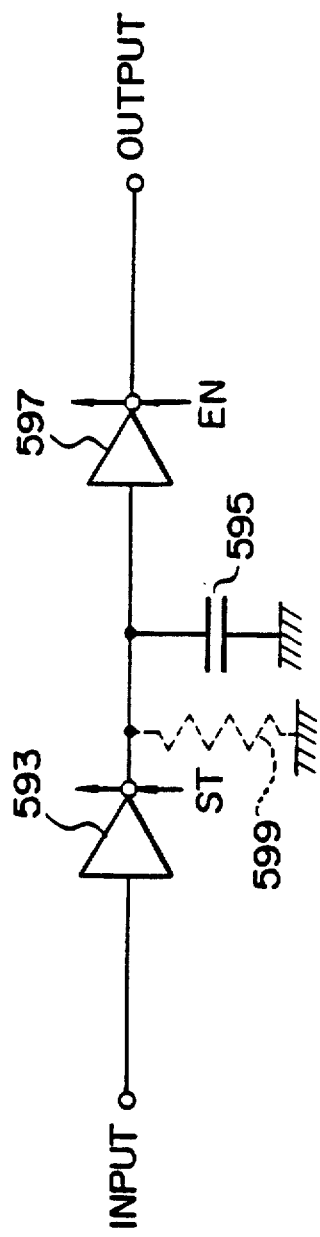
FIG. 41 is a circuit diagram showing a dynamic memory circuit in the memory section of FIG. 40.

FIG. 41 is a circuit diagram showing the internal arrangement of the dynamic memory in the memory section 413 of FIG. 24. The dynamic memory comprises a CMOS clocked inverter 593 for receiving an input signal in synchronism with an input read-in control signal ST, a MOS variable capacitor 595 inserted between the output terminal of the inverter 593 and ground, and a CMOS clocked inverter 597 for causing the data to be read out from the capacitor 595 in synchronism with the output enable signal EN. A parasitic resistance 599 is inserted between the output terminal of the inverter 597 and ground. The data storage time of the dynamic memory having the arrangement described above is determined by a time constant given by the capacitance of the capacitor 595 and the resistance of the resistor 599. Therefore, the capacitance of the capacitor 595 is determined in accordance with the data storage time required in the corresponding block. Since the capacitor 595 comprises a MOS capacitor, the size of the capacitor plate of the MOS capacitor is increased when a long data storage time is required. However, when a short data storage time is required, the size of the capacitor plate is decreased.

Figure 42:
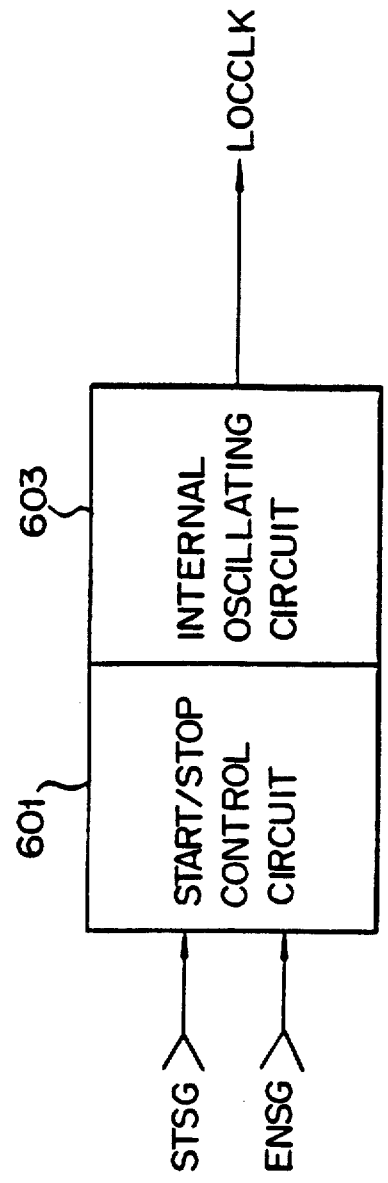
FIG. 42 is a block diagram showing the arrangement of an oscillation circuit in a timing signal generator.

FIG. 42 is a block diagram showing an oscillation circuit arrangement in the timing signal generator. This circuit comprises a start/stop control circuit 601 which receives an oscillation start signal STSG and an oscillation stop signal ENSG, and an internal oscillating circuit 603 which is controlled by an output from the circuit 601 so as to generate a clock signal LOCCLK during the operation. Various control signals such as the signals ST and EN are generated by using the clock signal LOCCLK generated from the circuit 603.

As shown in the timing charts of FIGS. 43A through 43C, in the above circuit, the signal LOCCLK is generated in response to the signal STSG and is stopped in response to the signal ENSG.

FIG. 44 is a circuit diagram showing a detailed arrangement of the circuit shown in FIG. 42.

The circuit 601 comprises an RS flip-flop of a pair of NOR gates 605 and 607. The circuit 603 comprises an AND gate 609, one input terminal of which receives the output from the circuit 601, an odd number of inverters 611 series-connected so as to sequentially invert the output from the AND gate 609, and an inverter 613 for inverting the output from the last inverter 611. The output stage output from the inverters 611 is fed back to the other input terminal of the AND gate 609.

Since most elements of the memory section comprise dynamic elements, the chip size can be decreased, and the operating frequency can be widened. Furthermore, since the timing signal generator is locally arranged in each functional block, an operation error will not occur even if the external clock is slowed or stopped, thereby guaranteeing the wide operation frequency range. Therefore, when the present invention is adapted to arrange a CMOS processing apparatus with a stand-by function, a high-performance processor can be provided with a high packing density at low cost.

The respective blocks in the chip perform functions at maximum speeds independently of the external clock rate and are stopped while the clock is not supplied. Therefore, power consumption during the execution of the machine instruction can be greatly decreased.

The signal delay time of the inverters 611 for locally generating the clock signal changes in accordance with the fabrication process. For example, when the switching speed is decreased, the local clock signal is slowed, thereby substantially preventing an operation error.

The present invention is not limited to the particular embodiments described above. For example, the internal bit structure of the instruction may be determined to satisfy the case wherein a plurality of control structure level instructions (loop or selection) are included or a plurality of arithmetic level instructions are included in one control structure level instruction.

Figure 46:
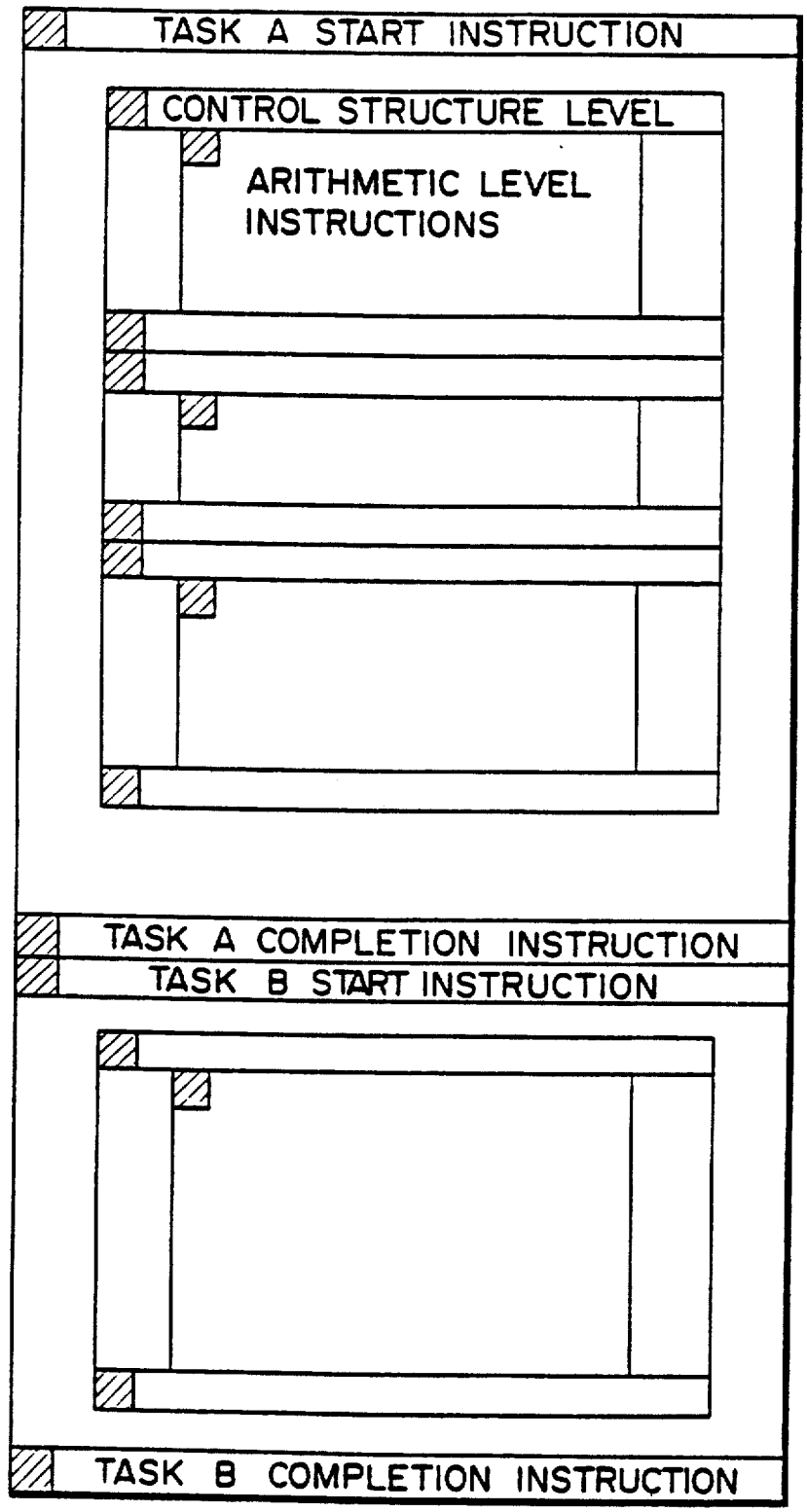
FIG. 46 is a representation showing another hierarchical function structure of the processing apparatus of the present invention.

When operations of an identical level continue, a bit string representing the level can be omitted. More specifically, as shown in FIG. 46, a bit string representing the hierarchical level is assigned to a hatched portion to cause the hierarchical microprocessor to effectively fetch the machine instruction stream.

The hierarchical structure of the embodiment described above comprises hierarchical functional blocks of the task level, the control structure level, the arithmetic level and the low order level. However, only two levels, i.e., the control level (task control, loop, sequential control, interrupt, procedure call, etc.) and the arithmetic level can be included in the hierarchical structure.

Temporary storage save operations such as an operation where another loop is included in a given loop, an operation where another procedure (including a recursive call) is called, and a multiple interrupt may be performed by selectively using a common memory area within the VLSI chip or a memory outside the chip in accordance with the requirements of a block of the lower level block.

What is claimed is:

1. A processing apparatus with a functional hierarchical structure, comprising:
    machine instruction decoding means for decoding a machine instruction having an operation code field with a hierarchical structure corresponding to functional levels and an operation object field with a hierarchical structure corresponding to that of the operation code field;
    a plurality of functional block means, connected to the machine instruction decoding means, each for performing one of a plurality of functional block operations and having a hierarchical structure corresponding to the hierarchical structure of said operation code field of said machine instruction;
    a plurality of bus groups arranged to interconnect said plurality of functional block means, each of said bus groups including a block code bus for transmitting a functional block identification code, a command bus for transmitting a functional block operation designating code, a communication bus for transmitting input/output data to the functional block means, and a status bus for transmitting current status data of a first functional block means to another functional block means and for transmitting instruction accept status data; and
    a plurality of bus drivers arranged to exchange the functional block identification code, the functional block operation designating code, and the input/output data between one of said plurality of bus groups and an external circuit, said plurality of bus drivers comprising a block code bus driver, a command bus driver, a communication driver, and a status bus driver.

2. An apparatus according to claim 1, wherein said processing apparatus is formed on a chip having four corners, four sides, a peripheral portion and a central portion, wherein said plurality of bus drivers are respectively located at the four corners of the chip, a highest order level functional block means among said plurality of functional block means being located near said command bus driver and said block code bus driver, a plurality of higher order level functional block means of the plurality of functional block means being located in the peripheral portion of said chip, a plurality of lower order level functional block means of the plurality of functional block means, which are immediately lower than said plurality of higher order level functional block means being sequentially located from the peripheral portion to the central portion of said chip, said plurality of bus groups being located between said higher and lower order level functional block means and being parallel to respective sides of said four sides of said chip, bus groups among said plurality of bus groups which are associated with the higher order level functional block means being located in the peripheral portion of said chip, and bus groups among said plurality of bus groups which are associated with the lower order level functional block means being located in the central portion of said chip.

3. A processing apparatus according to claim 1, wherein only functional blocks of a lower order level which are selected by the functional blocks of higher order levels are operated, and other blocks are not operated.

4. A processing apparatus according to claim 1, wherein a first functional block on a higher hierarchical level than a plurality of lower level functional blocks can, by its own judgement, select one of the plurality of lower level blocks.

* * * * *